(12) United States Patent
Yanof et al.

(10) Patent No.: US 7,683,948 B2
(45) Date of Patent: Mar. 23, 2010

(54) SYSTEM AND METHOD FOR BAD PIXEL REPLACEMENT IN IMAGE PROCESSING

(75) Inventors: Arnold W. Yanof, Tempe, AZ (US); Nikos Bellas, Chicago, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 983 days.

(21) Appl. No.: 11/095,447

(22) Filed: Mar. 31, 2005

(65) Prior Publication Data
US 2006/0221214 A1 Oct. 5, 2006

(51) Int. Cl.
H04N 9/64 (2006.01)
(52) U.S. Cl. .................... 348/246; 382/275
(58) Field of Classification Search ............ 348/246
See application file for complete search history.

(56) References Cited

U.S. PATENT DOCUMENTS

| | | | |
|---|---|---|---|
| 5,929,935 A | 7/1999 | Young et al. | |
| 6,154,258 A | 11/2000 | Ohtsuka | |
| 6,271,884 B1 | 8/2001 | Chung et al. | |
| 6,295,085 B1 | 9/2001 | Munson et al. | |
| 6,491,223 B1 | 12/2002 | Longacre, Jr. et al. | |
| 6,519,002 B1 | 2/2003 | Tomaszewski | |
| 6,765,614 B1* | 7/2004 | Matsukawa | 348/246 |
| 7,106,368 B2 | 9/2006 | Daiku et al. | |
| 2001/0052938 A1* | 12/2001 | Itoh | 348/246 |
| 2002/0025164 A1 | 2/2002 | Suzuki | |
| 2002/0131491 A1 | 9/2002 | Smith | |
| 2002/0154225 A1 | 10/2002 | Matsumoto et al. | |
| 2002/0158988 A1 | 10/2002 | Wischermann | |
| 2003/0035059 A1 | 2/2003 | Suzuki | |
| 2003/0090566 A1 | 5/2003 | Smith et al. | |
| 2003/0112343 A1 | 6/2003 | Katoh et al. | |
| 2003/0142239 A1 | 7/2003 | Yoshida et al. | |
| 2004/0012692 A1 | 1/2004 | Arazaki | |
| 2004/0032516 A1* | 2/2004 | Kakarala | 348/246 |
| 2004/0051798 A1* | 3/2004 | Kakarala et al. | 348/246 |
| 2004/0080630 A1 | 4/2004 | Kim | |
| 2004/0085458 A1 | 5/2004 | Yanof et al. | |
| 2005/0046704 A1 | 3/2005 | Kinoshita | |
| 2005/0248671 A1* | 11/2005 | Schweng | 348/246 |
| 2006/0055823 A1 | 3/2006 | Kinoshita et al. | |

FOREIGN PATENT DOCUMENTS

| | | |
|---|---|---|
| WO | 0213510 | 2/2002 |
| WO | 02098112 | 12/2002 |

* cited by examiner

*Primary Examiner*—Sinh Tran
*Assistant Examiner*—Paul Berardesca
(74) *Attorney, Agent, or Firm*—Ingrassia, Fisher & Lorenz, P.C.

(57) ABSTRACT

A system and method is provided for processing a digital image. The system and method processes image data by replacing bad pixel data in the digital image. Specifically, the system and method replaces bad pixel data in the image data by comparing each pixel to selected neighboring pixels, including pixels of other colors in some cases, and determining if the pixel is likely corrupt, such as from a detective pixel. Corrupted pixels are then replaced using averages, means, maximums, or other statistical functions of select nearby pixels.

16 Claims, 13 Drawing Sheets

| G(i-1,j-3) | B(i-1,j-2) | G(i-1,j-1) | B(i-1,j) | G(i-1,j+1) | B(i-1,j+2) |
|---|---|---|---|---|---|
| R(i,j-3) | G(i,j-2) | R(i,j-1) | G(i,j) | R(i,j+1) | G(i,j+2) |
| G(i+1,j-3) | B(i+1,j-2) | G(i+1,j-1) | B(i+1,j) | G(i+1,j+1) | B(i+1,j+2) |
| R(i+2,j-3) | G(i+2,j-2) | R(i+2,j-1) | G(i+2,j) | R(i+2,j+1) | G(i+2,j+2) |
| G(i+3,j-3) | B(i+3,j-2) | G(i+3,j-1) | B(i+3,j) | G(i+3,j+1) | B(i+3,j+2) |

| B(i-1,j-3) | G(i-1,j-2) | B(i-1,j-1) | G(i-1,j) | B(i-1,j+1) | G(i-1,j+2) |
|---|---|---|---|---|---|
| G(i,j-3) | R(i,j-2) | G(i,j-1) | R(i,j) | G(i,j+1) | R(i,j+2) |
| B(i+1,j-3) | G(i+1,j-2) | B(i+1,j-1) | G(i+1,j) | B(i+1,j+1) | G(i+1,j+2) |
| G(i+2,j-3) | R(i+2,j-2) | G(i+2,j-1) | R(i+2,j) | G(i+2,j+1) | R(i+2,j+2) |
| B(i+3,j-3) | G(i+3,j-2) | B(i+3,j-1) | G(i+3,j) | B(i+3,j+1) | G(i+3,j+2) |

| R(i-1,j-3) | G(i,j-3) | R(i+1,j-3) | G(i+2,j-3) | R(i+3,j-3) |
|---|---|---|---|---|
| G(i-1,j-2) | B(i,j-2) | G(i+1,j-2) | B(i+2,j-2) | G(i+3,j-2) |
| R(i-1,j-1) | G(i,j-1) | R(i+1,j-1) | G(i+2,j-1) | R(i+3,j-1) |
| G(i-1,j) | B(i,j) | G(i+1,j) | B(i+2,j) | G(i+3,j) |
| R(i-1,j+1) | G(i,j+1) | R(i+1,j+1) | G(i+2,j+1) | R(i+3,j+1) |
| G(i-1,j+2) | B(i,j+2) | G(i+1,j+2) | B(i+2,j+2) | G(i+3,j+2) |

SYSTEM AND METHOD FOR BAD PIXEL REPLACEMENT IN IMAGE PROCESSING

FIELD OF THE INVENTION

This invention generally relates to imaging systems, and more specifically relates to digital imaging.

BACKGROUND OF THE INVENTION

Digital imaging systems have created a revolution in photography and cameras. A digital camera is similar to a film camera except that the film is replaced with an electronic sensor. The sensor is comprised of an array of photo detectors that change the photons that strike them into electrons providing a signal at each pixel proportional to the number of photons, or the amount of light at each pixel. Presently, most consumer digital cameras employ Charge Coupled Device (CCD) or Complementary Metal Oxide Semiconductor (CMOS) sensors. To facilitate the collection of light, many of the sensors employ a small lens-like structure covering each pixel, which is called a microlens. These microlenses are typically made by forming a layer of photoresist that is placed upon the pixel frame.

The image sensors used in digital imaging are inherently monochrome devices, having no color discriminating ability associated with each detector. For this reason, the sensors typically employ a color filter array (CFA) inserted between the microlens and each active portion of the pixel structure. Typically the CFA is constructed to assign a single color to each pixel. Digital camera manufacturers often chose among a variety of CFA architectures, usually based on different combinations of primary colors (red, green, blue) or complementary colors (cyan, magenta, yellow). Regardless of the particular CFA used, the overall aim is to transfer only a single color of interest, so that each pixel only sees on color wavelength band.

One of the most popular CFA patterns is called a Bayer pattern, which places red, green and blue filters over the pixels in a checkerboard pattern that has twice the number of green squares as red or blue. The theory behind the Bayer pattern is that the human eye is more sensitive to wavelengths of light in the green region than wavelengths representing red and blue. Therefore, doubling the number of green pixels provides greater perceived luminance information and detail, while providing a natural color representation for the human eye.

When subjected to light, the image sensor converts incident photons to electrons. The conversion enables analog electronic circuitry to process the image "seen" by the sensor array. The electrons gathered by these sensors are stored in small capacitors that are read out as a series of varying voltages, which are proportional to the image brightness. An Analog to Digital Converter (ADC) conditions these voltages for processing by a computer within the camera. The data is then processed to form a picture of the image "seen" by the sensor array.

As digital imaging becomes more prevalent, industry is striving to develop images and video with better resolution and color accuracy, while also striving to reduce cost and complexity in digital cameras. Typically, there is a tradeoff in digital cameras among costs, size and quality of optics. Low cost and relatively small size optics are required for some applications, such digital cameras that are included in wireless phones. In these applications design requirements may lead to spatial variations in image attributes and quality over the image. These variations can lead to unacceptable image quality.

Furthermore, the image sensors themselves are prone to defects which can produce visible and undesirable imaging errors. For example, some pixel errors can result in dark spots in bright areas, and/or bright spots in dark errors. These defects can be highly unexpected and thus draw the viewing eye to them by fundamental sensory mechanism. The result again can lead to unacceptable image quality.

BRIEF DESCRIPTION OF DRAWINGS

The preferred exemplary embodiment of the present invention will hereinafter be described in conjunction with the appended drawings, where like designations denote like elements, and:

FIG. 4 is a first exemplary pixel diagram;

FIG. 6 is a second exemplary pixel diagram;

FIG. 8 is a third exemplary pixel diagram;

DETAILED DESCRIPTION OF THE INVENTION

The present invention provides a system and method for processing a digital image. The system and method processes image data by replacing bad pixel in the digital image. This improves the quality of the image and reduces the effects of defects in the image sensor.

Specifically, the system and method replaces bad pixel data in the image data by comparing each pixel to selected neighboring pixels, including pixels of other colors in some cases, and determining if the pixel is likely corrupt, such as from a detective pixel. Corrupted pixels are then replaced using averages, means, maximums, or other statistical functions of select nearby pixels. The system and method provides improvement over traditional pixel replacement by analyzing and replacing individual pixels differently depending on their color, luminance and the color and luminance of neighboring pixels. This results in bad pixel replacement that can aggressively replace pixels that are likely to be problematic to the viewer while still maintaining good detail in the image.

Figure 1:
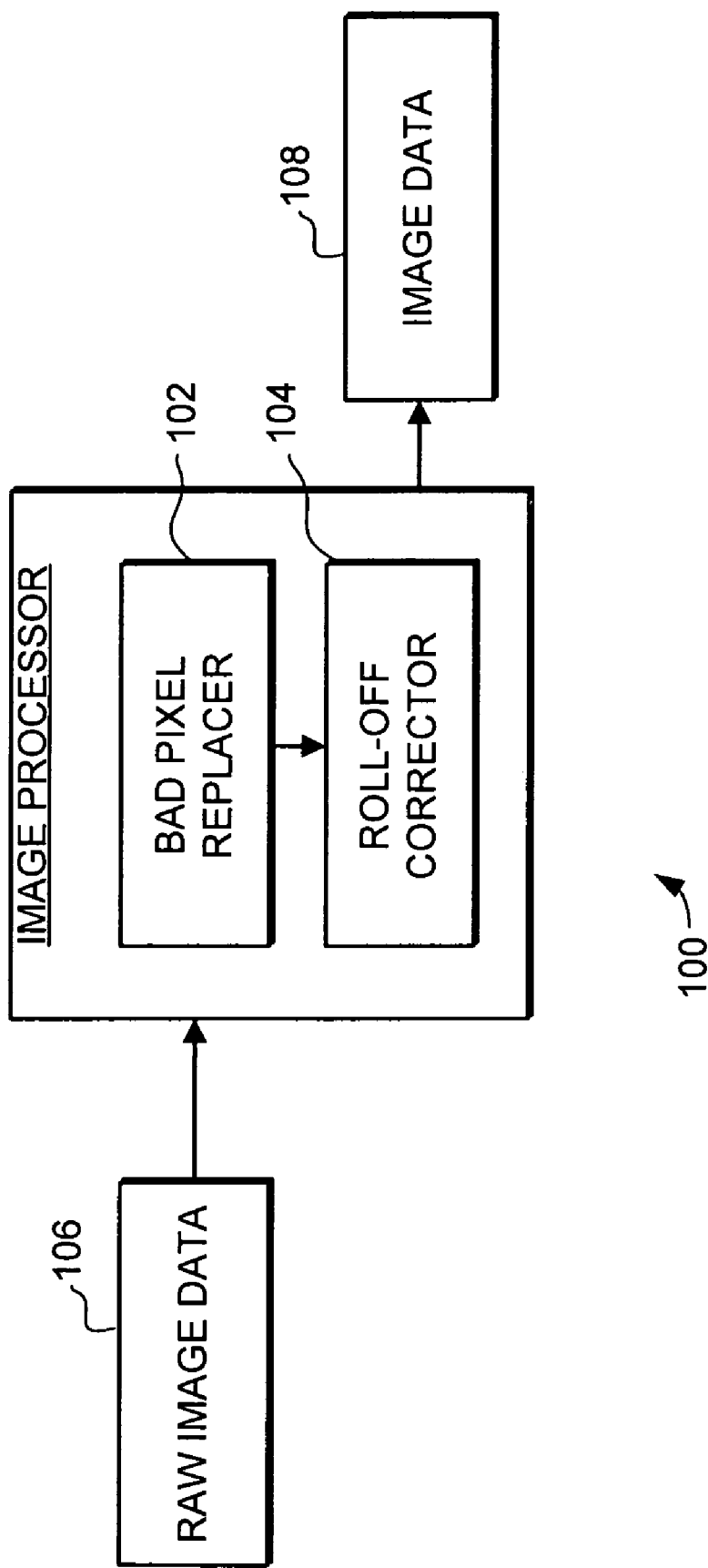
FIG. 1 is a schematic view of an image processor in accordance with a first embodiment of the invention.

Turning now to FIG. 1, an image processor 100 is illustrated schematically. The image processor 100 includes a bad pixel replacer 102 and a roll-off corrector 104. The image processor 100 receives raw image data 106, and replaces bad replacing bad pixel data using bad pixel replacer 102, corrects for roll-off variability using roll-off corrector 104, and outputs processed image data 108. The resulting image data 108 has improved image quality, with reduced defects and reduced image variability.

The bad pixel replacer 102 replaces bad pixel data in the image data by comparing each pixel to selected neighboring pixels, including pixels of other colors in some cases, and determining if the pixel is likely corrupt. Corrupted pixels are then replaced using means, averages or maximums of select nearby pixels. The bad pixel replacer 102 provides improvement over traditional pixel replacement by analyzing and replacing individual pixels differently depending on their color, luminance and the color and luminance of neighboring pixels. This results in bad pixel replacement that can aggressively replace pixels that are likely to be problematic to the viewer while still maintaining good detail in the image, e.g., not replacing good pixels erroneously or adding features that the accuracy of the image.

The roll-off corrector 104 corrects for roll-off in image data by determining for each pixel a roll-off contour in which the pixel resides and adjusting that pixel based upon its being located on that particular roll-off contour. The roll-off corrector 104 can be adapted to correct for unwanted variability in luminance, color, and/or modulation transform function. The roll-off corrector 104 defines contours used for roll-off correction in a way that facilitates determination of each pixel's roll-off contour using relatively low amount of computing resources. For example, the roll-off corrector 104 can define the roll-off contours as sets of linear segments that together form a closed contour around an area of the image. This facilitates determination of roll-off contour and subsequent pixel adjustment of luminance, color and/or modulation transform function while requiring relatively low computing resources.

The image processor 100 is thus able to replace bad pixel data and correct for roll-off variability in the digital image in an effective and efficient manner, and thus can improve the quality of the image and reduce the effects of defects in the image sensor.

Figure 2:
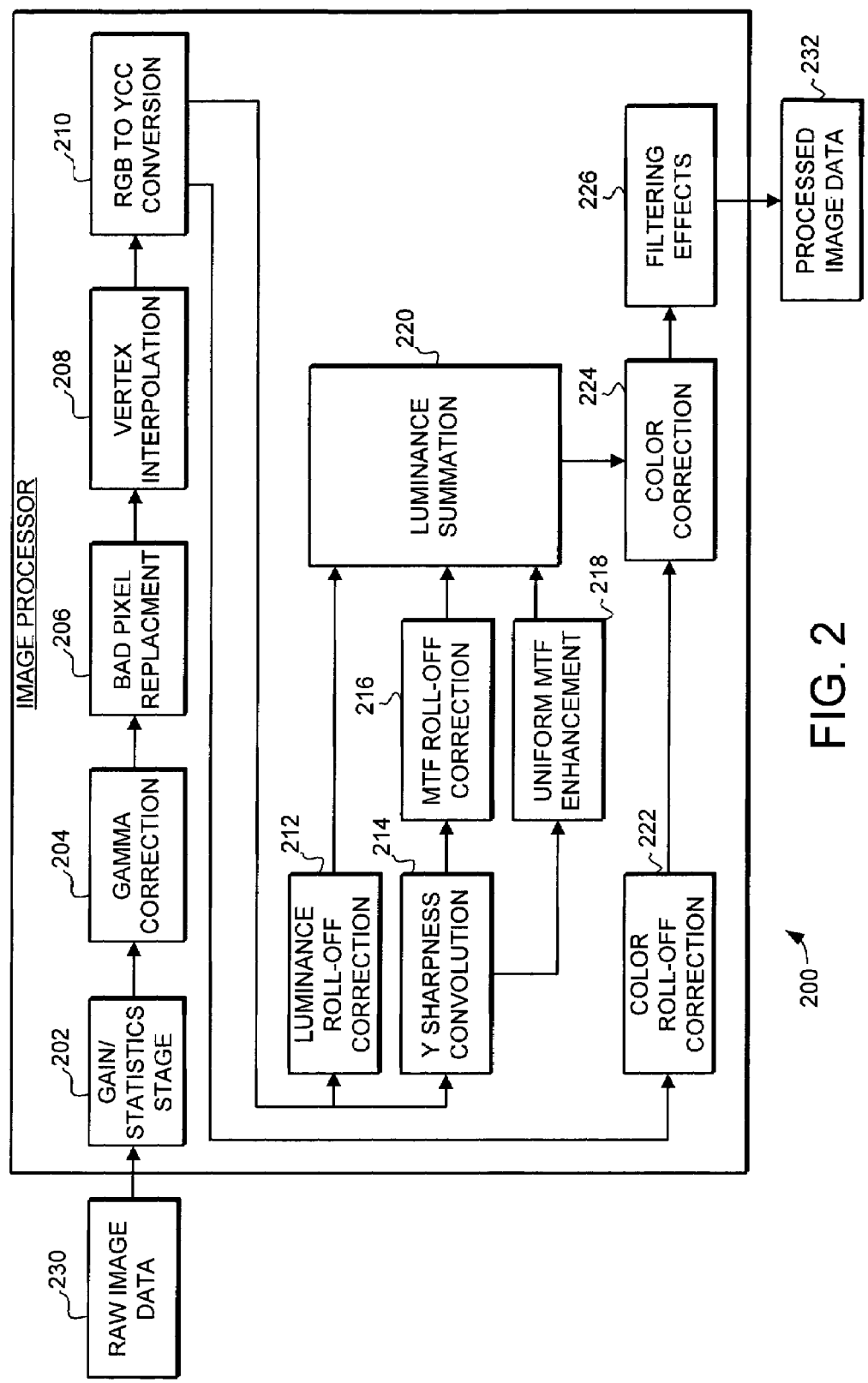
FIG. 2 is a schematic view of an image processor in accordance with a second embodiment of the invention.

Turning now to FIG. 2, a second embodiment image processor 200 is illustrated. The second embodiment image processor 200 illustrates the embodiments of the invention in the context of a multifunction image processor that performs several types of image processing on image data. The image processor 200 receives raw image data 230 and outputs processed image data 232. The image processor 200 performs several types of image processing, including bad pixel replacement and roll-off correction for luminance, color and modulation transform function (MTF). The image processor 200 includes a gain/statistics stage 202, a gamma correction module 204, a bad pixel replacement module 206, a vertex interpolation module 208, an RGB to YCC conversion module 210, a luminance roll-off correction module 212, a Y sharpness convolution module 214, a MTF roll-off correction module 216, a uniform MTF enhancement module 218, a luminance summation module 220, a color roll-off correction module 222, a color correction module 224, and a filtering effects module 226.

The image processor 200 receives raw image data. For example, image processor 200 can be included in a camera, the camera receiving an optical image into an optical section of the camera. The optical section includes lenses and filters, such as a Bayer pattern color filter array. A Bayer pattern color filter alternates rows, for example, of red and green filters with rows of blue and green filters. In a Bayer pattern, the pixels are not evenly divided, there are as many green pixels as there are red and blue combined. This is acceptable because the human eye is not equally sensitive to all three colors.

Light containing the optical image data passes through the camera's optical section and enters an analog section where it is detected by photo-sensors such as a CMOS array. The output of the photosensors are then typically amplified and digitized by an amplifier and an analog-to-digital converter. This produces raw image data 230 that is received by the image processor 200. When the optical section includes a Bayer pattern filter, the raw image data 203 will comprises a mosaic of red, green and blue pixels different intensity values. For example, the raw image data can comprise 8 bit intensity representations [0-255] for each red, green and blue pixel.

The raw image data 230 is first passed to a gain/statistics stage 202. The gain/statistics stage 202 helps controls the operation of the camera, and thus can include elements for automatic exposure control and white balancing. Typically, the gain/statistics stage 202 is used to control the operation of the photo-sensors (e.g., exposure time) using a feedback path. The image data itself is passed through the gain stage 202 to the gamma correction module 204. Gamma correction module 204 serves to improve the contrast of the image. Typically, the gamma correction module 204 improves the detected image by adding detail and contrast to dark areas, and reducing contrast in the bright areas. To accomplish this, the gamma correction module 204 can use any suitable gamma correction technique, such as one which amplifies contrast differences in low sensitivity portions of the sensor light response function, and correspondingly attenuates excessive contrast in high sensitivity places in the response.

The gamma corrected image data is passed to the bad pixel replacement module 206. In general, the bad pixel replacement module 206 replaces bad pixel data in the image data by comparing each pixel to selected neighboring pixels, including pixels of other colors in some cases, and determining if the pixel is likely corrupt. Corrupted pixels are then replaced using means, averages, maximums or other statistical functions of select nearby pixels. The bad pixel replacement module 206 provides improvement over traditional pixel replacement by analyzing and replacing individual pixels differently depending on their color, luminance, and the color and luminance of neighboring pixels. This results in bad pixel replacement that can aggressively replace pixels that are likely to be problematic to the viewer while still maintaining good detail in the image, and avoiding erroneous alternations in the image, such as displacing the correct boundaries between light and dark areas, or poorly representing colors of items in the image.

As one example of a specific embodiment, the bad pixel replacement module 206 compares each pixel to selected neighboring pixels based on the color the pixel, the local color and the local flatness surrounding the pixel. For example, the bad pixel replacement module 206 can replace bright green pixels that exceed selected neighboring pixels by a first threshold difference with an average of selected nearby pixels. Likewise, the bad pixel replacement module 206 can replace dark green pixels that are less than selected neighboring pixels by a second threshold difference with an average of selected nearby pixels. By appropriate selection of the threshold values and selected neighboring and nearby pixels, the bad pixel replacement can provide aggressive pixel replacement that does not compromise much visible high spatial frequency detail.

The bad pixel replacement module 206 can likewise replace red pixels by testing for flatness in the local of the red pixel and measuring brightness in the locale of the red pixel. Very bright red pixels that exceed each selected neighboring pixel by a first threshold difference can then be replaced with the maximum of selected nearby pixels, including both green and red pixel values. Moderately bright red pixels that exceed each selected neighboring pixel by a second threshold difference are replaced with a maximum of selected nearby pixels if the area around the red pixel is locally flat or locally dark. Very dark red pixels that are less than each selected neighboring pixel by a third threshold difference are replaced with a mean of selected nearby pixels. Finally, moderately dark red pixels that are less than each selected neighboring pixel by a fourth threshold difference are replaced with a mean of selected nearby pixels if locally flat. By appropriate selection of threshold values, neighboring and nearby pixels, and locally dark and locally flat criteria, objectionable red pixels can be replaced without excessive loss of detail. In particular, because both the green and red pixels are considered for the replacement of the red pixels, bright yellow lines that are made from red pixels can be distinguished from red pixels that are bad. Thus, the red pixels in bright yellow lines are preserved while bad red pixels are replaced.

The bad pixel replacement module 206 can likewise replace blue pixels by testing for flatness in the local of the blue pixel and measuring brightness in the locale of the blue pixel. Very bright blue pixels with values that exceed any pair of selected neighboring pixels by a first threshold difference can then be replaced with the mean of selected nearby pixels if the area around the blue pixel is locally flat or locally dark. Very dark blue pixels with values less than each selected neighboring pixel by a second threshold difference are replaced with a mean of selected nearby pixels if the area around the blue pixel is locally flat. Finally, moderately dark blue pixels with values that are less than each selected neighboring pixel by a third threshold difference are replaced with a mean of selected nearby pixels if locally flat and locally dark. Again, by appropriate selection of threshold values, neighboring and nearby pixels, and locally dark and locally flat criteria, objectionable blue pixels can be replaced without excessive loss of detail. Several examples of specific methods for bad pixel replacement will be discussed in detail below.

The image data with replaced bad pixels is passed to the vertex interpolation module 208. In vertex interpolation, the values for red, green and blue pixels are averaged together to create a red, green and blue value for each pixel location. Thus, raw Bayer format data, which only vaguely resembles the intended image, is converted to a full color format. It should be noted that any suitable type of vertex interpolation, or other type of interpolation can be used. The final format selected would depend upon a particular application. Again, one suitable format uses 8 bits for each color (e.g., Red, Blue, Green), providing 0-255 values for each color in each pixel.

The image data is passed to the RGB to YCC conversion module 210. The RGB to YCC conversion module 210 converts the image data from a red, green, blue format to a luminance (Y) and two chrominance (C) channels. The Y luminance component contains the bright and dark contrast information of the image. The $C_b$ component contains the blue versus green information. The $C_r$ component contains the red versus green information. As will be described in detail below, this conversion facilitates separate roll-off correction for luminance and color in the image data. Of course, it should be noted that other suitable formats could also be used.

The output of the RGB to YCC conversion module 210 is passed to the luminance roll-off correction module 212, the Y sharpness convolution module 214 and the color-roll off convolution module 222. The Y sharpness convolution module 214 is an amplification method for high spatial frequency part of the image data, based upon comparing the luminance at a pixel with the average luminance at surrounding points, and adjusting the luminance of the pixel in question, so as to enhance the difference.

The output of the Y sharpness convolution module 214 is passed to the MTF roll-off correction module 216 and the uniform MTF enhancement module 218. The uniform MTF enhancement module 218 provides a uniform enhancement of the MTF over the image. The MTF enhancement can be performed by adding various proportions of the sharpness convolution to the existing luminance value. There is a uniform addition across the entire image extent to achieve visually appealing image sharpness; and in addition, some additional proportion of the sharpness convolution added according to the position contour, so that low MTF regions, far from the axis of the image, appear more on a par of sharpness with the central (axial) region of the image. The output of the uniform MTF enhancement module 218 is passed to the luminance summation module 220.

As stated above, the output of the RGB to YCC conversion module 210 is passed to the luminance roll-off correction module 212 and the color roll-off correction module 222. Each of the three roll-off correction elements performs its respective roll-off correction based on its respective plurality of roll-off contours. Specifically, each type of roll-off correction determines for each pixel a roll-off contour in which the pixel resides and adjusts that pixel based upon its roll-off contour. The luminance roll-off correction module 212 adjusts the luminance of the pixel based upon its luminance roll-off contour. The color roll-off correction module 222 adjusts the color of the pixel based upon its color roll-off contour. Finally, the MTF roll-off correction adjusts the MTF of the pixel based upon its MTF roll-off contour. Thus, each of these elements adjusts the pixel data to correct for its type of roll-off in the image data.

The roll-off contours used by these elements are preferably defined in a way that facilitates determination of each pixel's roll-off contour using relatively low amount of computing resources. For example; the roll-off contours can be defined as sets of linear segments that together form a closed contour around an area of the image. This facilitates determination of roll-off contour and subsequent pixel adjustment of luminance, color and/or modulation transfer function while requiring relatively low computing resources. It should be note that preferably, different roll-off contours are used for luminance, color and MTF correction. This allows each feature of the pixel data to be adjusted based on the roll-off variability of that feature. However, in some cases it may be acceptable to use the same roll-off contour definitions for more than one feature. It should also be noted that in addition to adjusting for roll-off, the elements can also be adapted to adjust for other spatial distortions, such as side to side distortion or top to bottom distortion. As used herein, roll-off is defined as a pattern of deviation from accuracy in an image, characterized by concentric oval, circular, or oblong curves, along which the deviation is consistent, such that there is a monotonic or steady worsening in the deviation as one travels toward the edge of the image from a central image point. That central point having minimal nonuniformity, and lying at the optical axis of the lens The output of the luminance roll-off correction module 212, MTF roll-off correction module 216 an uniform MTF enhancement module 218 are each passed to luminance summation module 220. There, the luminance data is recombined to recreate the Y channel of the image data. The idea is to treat the nonuniformity in the most efficient way, and avoid correcting the corrections themselves, as this can cause a propagation of errors or an increase in digitization noise.

The output of the color roll-off correction module 222 and the output of the luminance summation module 222 are passed to the color correction module 224. This provides general color correction of the image data using any suitable technique. The output of the color correction is passed to filtering effects module 226, which performs filtering and/or color space manipulation using any suitable technique. This results in the final processed image data 232, which can then be further processed as desired. For example, it can be resized and/or converted to a desirable image format, such as JPEG or GIF.

The image processor 200 can be implemented using a variety of techniques. In general the image processor is configured to tangibly embody a program of instructions to perform the various method steps used in the embodiments of the invention. For example, it can be implemented in the form of an application specific integrated circuit (ASIC) utilizing CMOS technology. In such an implementation, the elements of image processor 202 are formed with a variety of transistors, resistors, and diodes fabricated onto a semiconductor material such as silicon or gallium arsenide, using any suitable fabrication process. As another example, it can be implemented as a software sequence. In such an implementation, the elements of processor 200 are formed from functions and sequences of primitive arithmetic operations that can be executed sequentially on a master control unit (MCU). Or, the MCU can direct various operations to be performed in hardware on blocks of data. The processor 200 is preferably implemented in a parallel, pipelined architecture. In such a circuit, one sub-circuit, or block, acts upon one part of the image, performing operations A, and sends it down the pipeline to another circuit block, which performs operations B. The first circuit block is then free to perform operations A upon the next pixel, or group of pixels, simultaneously while B is operating on the first pixel or group of pixels. In this way, the implementation can meet a typical requirement of processing X many frames per second, where X is typically 15-30, or fast enough to process a video sequence of images.

Figure 3:
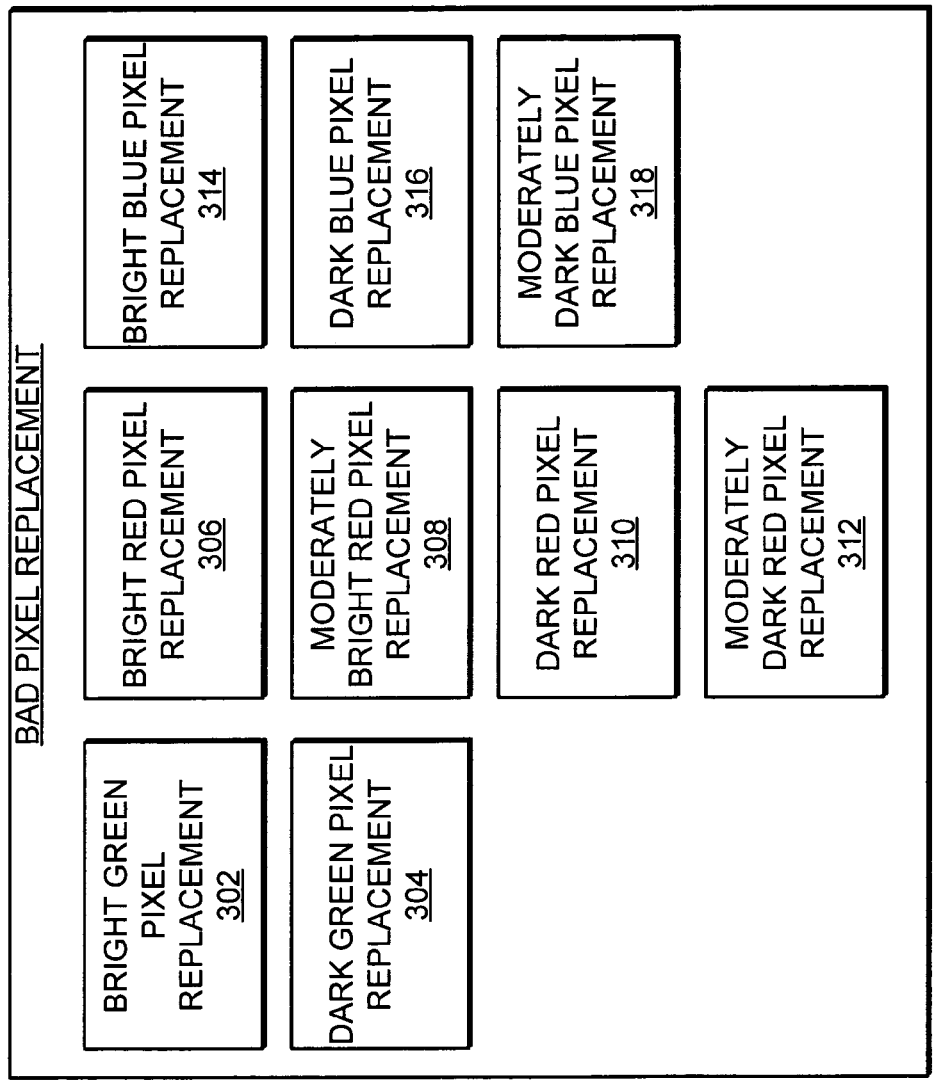
FIG. 3 is a schematic view of a bad pixel replacement device in accordance with an embodiment of the invention.

Turning now to FIG. 3, an exemplary bad pixel replacement 300 is illustrated. Bad pixel replacement 300 is exemplary of the type of element that can be used in image processor 100 and image processor 200. The bad pixel replacement 300 includes elements for bright green pixel replacement 302, dark green pixel replacement 304, bright red pixel replacement 306, moderately bright red pixel replacement 308, dark red pixel replacement 310, moderately dark red pixel replacement 312, bright blue pixel replacement 314, dark blue pixel replacement 316, and moderately dark blue pixel replacement 318. In each case, the bad pixel replacement 300 compares a pixel under test to selected neighboring pixels using threshold values. The threshold values can be different for each color and brightness combination. Likewise, the neighboring pixels used can be different for bad pixel replacement of different color pixels. Furthermore, nearby pixels used to generate replacement pixels can be different for each color, and the method of determining the replacement (mean, maximum, etc.) can be different for each color. Final, in some cases pixel replacement can depend upon whether or not the area around the pixel is locally flat or locally dark. Providing such flexibility allows for aggressive bad pixel replacement while still maintaining good detail in the image.

Turning now to FIG. 4, an exemplary pixel array 400 is illustrated. The pixel array 400 is a Bayer pattern, which places red, green and blue filters over the pixels in a checkerboard pattern that has twice the number of green squares as red or blue. Specifically, a Bayer pattern alternates rows of red and green pixels with rows of blue and green pixels. In the pixel array 400, the exemplary green pixel G(i, j) is the pixel that is to be evaluated, and the various other neighboring and nearby pixels are identified by their color and relative displacement from the green pixel G(i, j). For example, the red pixel R(i, j+1) is the red pixel next to the green pixel G(i, j), and the blue pixel B(i+1, j) is the blue pixel below the green pixel G(i, j). It should also be noted that while the exemplary green pixel G(i, j) is a green-red row, the procedure also applies to green pixels in a green-blue row.

Figure 5:
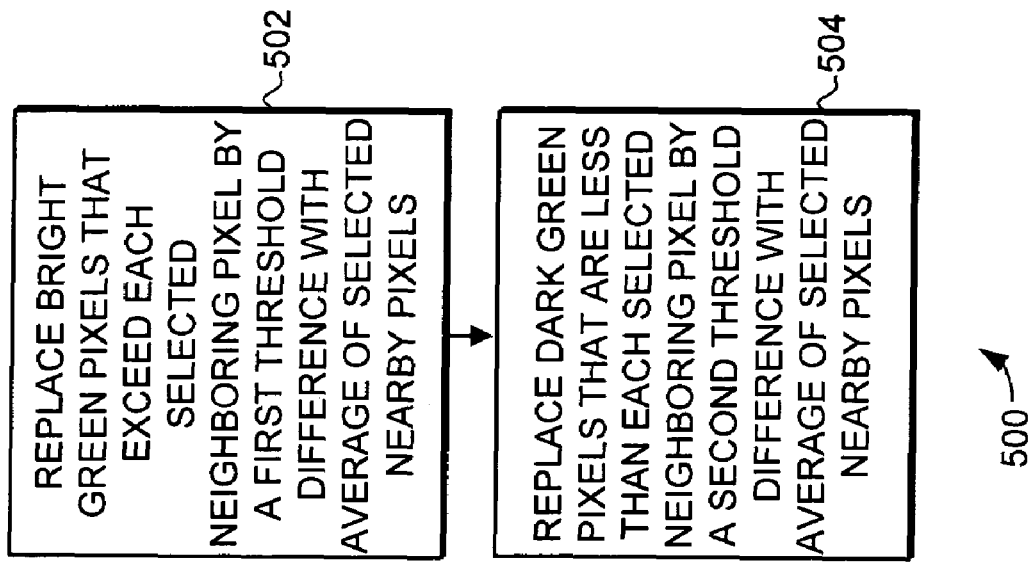
FIG. 5 is a flow diagram illustrating a bad green pixel replacement method in accordance with an embodiment of the invention.

The exemplary pixel array 400 will be used to illustrate an exemplary green pixel replacement procedure. Turning now to FIG. 5, a flow diagram illustrates a method 500 for bad pixel replacement of green pixels. The first step 502 of method 500 is to replace bright green pixels that exceed each selected neighboring pixel by a first threshold difference with an average of selected nearby pixels. In performing such a replacement, a variety of different neighboring and nearby pixels could be selected to serve as the basis for green pixel replacement. For example, step 502 can be performed with the following procedure where $TG_1$ is the first threshold value and G(i, j) is the green pixel being evaluated:

If $G(i, j)-G(i-1, j-1)>TG_1$ and $G(i, j)-G(i-1, j+1)>TG_1$ and $G(i, j)-G(i+1, j+1)>TG_1$ and $G(i, j)-G(i+1, j-1)>TG_1$ and $G(i, j)-G(i, j+1)>TG_1$ and $G(i, j)-G(i+2, j)>TG_1$ then replace G(i, j) with the average of G(i-1, j-1), G(i-1, j+1), G(i+1, j+1) and G(i+1, j-1).

As one example, the first threshold value $TG_1$ is set at 40 in a 0-255 color format. In this exemplary procedure, the green pixel is compared to six neighboring green pixels. If the difference between the green pixel and all six neighboring green pixels is greater than the threshold amount, the green pixel is replaced with an average of four nearby pixels. This provides a fairly aggressive pixel replacement that does not compromise much visible high spatial frequency detail. The procedure looks at the four nearest green neighbors, plus two additional pixels below and to the right of the pixel of interest. This is generally preferable, as left and upward pixels may have already been corrected and can lead to propagating errors moving down the image.

Returning now to method 500, the next step 504 is to replace dark green pixels that are less than each selected neighboring pixel by a second threshold difference with an average of selected nearby pixels. For example, step 504 can be performed with the following procedure where $TG_2$ is the second threshold value and G(i, j) is the green pixel being evaluated:

If $G(i,j)-G(i-1,j-1)<-TG_2$ and $G(i,j)-G(i-1,j+1)<-TG_2$ and $G(i,j)-G(i+1,j+1)<-TG_2$ and $G(i,j)-G(i+1,j-1)<-TG_2$ and $G(i, j)-G(i, j+1)<-TG_2$ and $G(i, j)-G(i+2, j)<-$Then replace G(i, j) with the average of G(i-1, j-1), G(i-1, j+1), G(i+1, j+1) and G(i+1, j-1).

As one example, the second threshold value $TG_2$ is set at 40 in a 0-255 color format. Again, the green pixel is compared to six neighboring green pixels. If the difference between the green pixel and all six neighboring green pixels is less than the second threshold amount, the green pixel is replaced with an average of four nearby pixels. This again provides a fairly aggressive pixel replacement that does not compromise much visible high spatial frequency detail.

It should be noted that while this detailed example uses the same neighboring pixels and the same threshold values in evaluating and replacing both bright and dark green pixels, that in many cases it would be desirable to use different pixels for bright and dark and different threshold values for bright and dark. Thus, the first threshold value and the second threshold value can be the same value or different values.

Typically, such values would be determined by simple experiments on the visibility of single bright or dark pixels on a flat field.

Turning now to FIG. 6, a second exemplary pixel array 600 is illustrated. Again, the pixel array 600 is a Bayer pattern, which places red, green and blue filters over the pixels in a checkerboard pattern that has twice the number of green squares as red or blue. In the pixel array 600, the exemplary red pixel R(i, j) is the pixel that is to be evaluated, and the various other neighboring and nearby pixels are identified by their color and relative displacement from the red pixel R(i, j). For example, the green pixel G(i, j+1) is the green pixel next to the red pixel R(i, j), and the blue pixel B(i+1, j+1) is the blue pixel below and to the right of the red pixel R(i, j).

Figure 7:
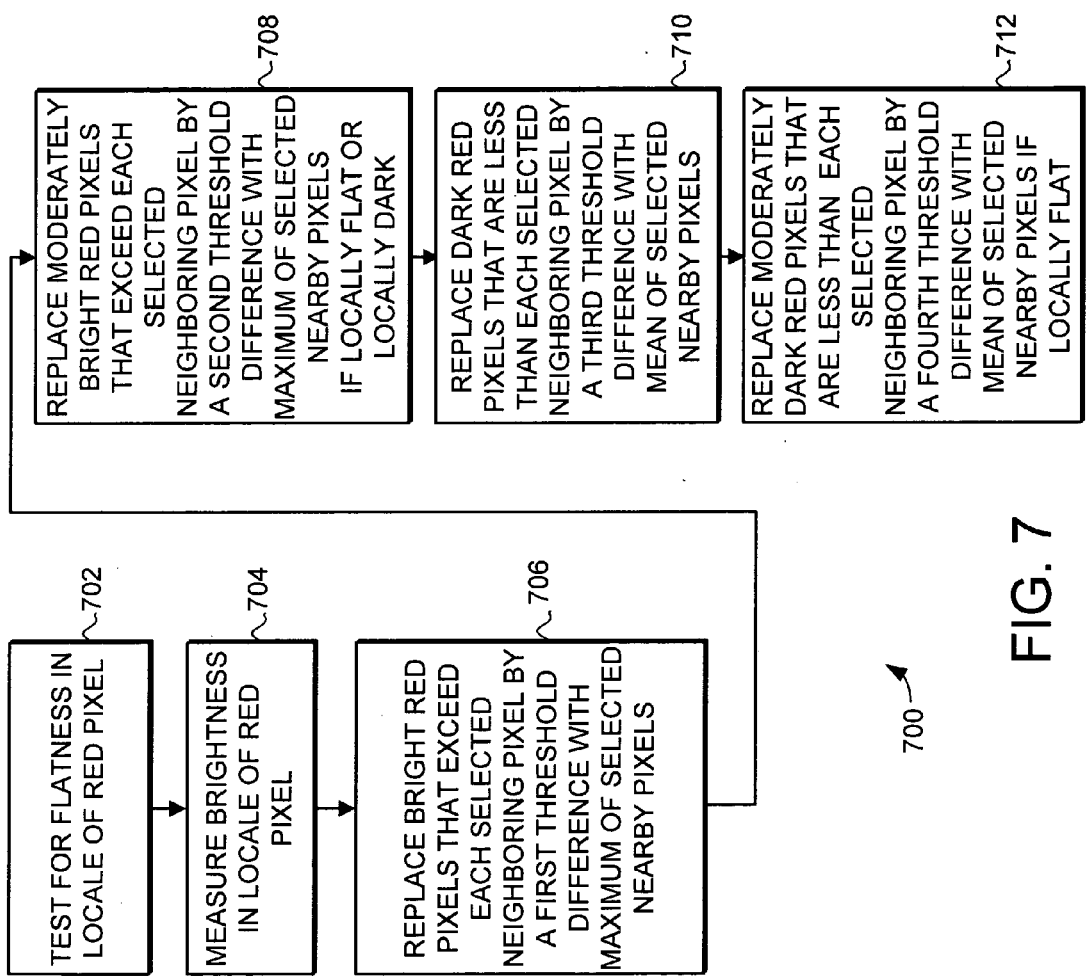
FIG. 7 is a flow diagram illustrating a bad red pixel replacement method in accordance with an embodiment of the invention.

The exemplary pixel array 600 will be used to illustrate an exemplary red pixel replacement procedure. Turning now to FIG. 7, a flow diagram illustrates a method 700 for bad pixel replacement of red pixels. The first step 702 of method 700 is to test for flatness in the local of the red pixel. When local flatness is found, a more aggressive threshold can be used to replace moderately bright red pixels without unwanted loss of detail. In general, flatness occurs when the maximum difference between pixels in the area is below a defined threshold. For example, local flatness around red pixel R(i, j) can be defined by the procedure:

If max (G(i−1, j), G(i, j+1), G(i+1, j+2), G(i+2, j+1), G(i+1, j), G(i, j−1))−min( G(i−1, j), G(i, j+1), G(i+1, j+2), G(i+2, j+1), G(i+1, j), G(i, j−1))<$LFT_R$ where $LFT_R$ is the local flatness threshold for red, then the local flatness value $LF_R$ is set to true. As one example, the local flatness threshold $LFT_R$ is set to 40 in a 0-255 color format. Again, this is just one example of how local flatness can be determined.

The next step 704 is measure brightness in the locale of the red pixel. Measuring brightness in the local of the red pixel allows for a more aggressive replacement of moderately bright red pixels without loss of detail. In general, measuring brightness involves measuring the brightness of pixels surrounding the red pixel of interest. For example, measuring local brightness around red pixel R(i, j) can be done by calculating the mean of pixels G(i−1, j), G(i, j+1), G(i+1, j) and G(i, j−1)) setting that mean equal to a local brightness $B_{avg}$. Of course, other pixels could be used to determine the local brightness.

The next step 706 is to replace bright red pixels that exceed each selected neighboring pixel by a first threshold difference with a maximum of selected nearby pixels. In performing such a replacement a variety of different neighboring and nearby pixels could be selected to serve as the basis for red pixel replacement. For example, step 706 can be performed with the following procedure where $TR_1$ is the first threshold value and R(i, j) is the red pixel being evaluated:

If R(i, j)−R(i, j+2)>$TR_1$ and R(i, j)−R(i+2, j)>$TR_1$ and R(i, j)−G(i−1, j)>$TR_1$ and R(i, j)−G(i, j−1)>$TR_1$ then replace R(i, j) with the maximum of R(i, j+2), R(i+2, j), G(i−1, j) and G(i, j−1).

As one example, the first threshold value $TR_1$ is set at 80 in a 0-255 color format. In this exemplary procedure, the red pixel is compared to two neighboring red pixels and two neighboring green pixels. If the difference between the red pixel and all four neighboring red and green pixels is greater than the threshold amount, then the red pixel is replaced with a maximum of four nearby pixels. This method replaces very bright red pixels without referring to the flatness or brightness of the locale. It should be noted that while above the green pixels were replaced with an average of nearby pixels, the bright red pixels are replaced with the maximum of the surrounding red and green pixels. This helps preserve highlights in locales rich in spatial detail. Specifically, because red pixels make up only ¼ of the Bayer array a fine yellow line can look like isolated bright red pixels. Thus, it is important to refer to the green pixels to determine if the bright red pixels are part of a generally bright feature, such as a fine yellow line, and should not be replaced.

Returning now to method 700, the next step 708 is to replace moderately bright red pixels that exceed each selected neighboring pixel by a second threshold difference with a maximum of selected nearby pixels if the area is locally flat or locally dark. In performing such a replacement, a variety of different neighboring and nearby pixels could be selected to serve as the basis for red pixel replacement. For example, step 708 can be performed with the following procedure where $TR_2$ is the second threshold value, DKR is the locally dark threshold, and R(i, j) is the red pixel being evaluated:

If R(i, j)−R(i, j+2)>$TR_2$ and R(i, j)−R(i+2, j)>$TR_2$ and R(i, j)−G(i−1, j)>$TR_2$ an R(i, j)−G(i, j−1)>$TR_2$ and ($LF_R$ is true or $B_{avg}$<DKR) then replace R(i, j) with the maximum of R(i, j+2), R(i+2, j), G(i−1, j) and G(i, j−1).

As one example, the second threshold value $TR_2$ is set at 20 and the locally dark threshold DRK is set at 110 in a 0-255 color format. In this exemplary procedure, the red pixel is again compared to two neighboring red pixels and two neighboring green pixels. If the difference between the red pixel and all four neighboring red and green pixels is greater than the threshold amount, and the area is locally dark or locally flat, the red pixel is replaced with maximum of four nearby pixels. This method replaces moderately bright red pixels using a more aggressive threshold coupled with local flatness and darkness testing to avoid a loss of detail.

Returning now to method 700, the next step 710 is to replace dark red pixels that are less than each selected neighboring pixel by a third threshold difference with a mean of selected nearby pixels. For example, step 710 can be performed with the following procedure where $TR_3$ is the third threshold value and R(i, j) is the red pixel being evaluated:

If R(i, j)−R(i, j+2)<−$TR_3$ and R(i, j)−R(i+2, j+2)<−$TR_3$ and R(i, j)−R(i+2, j)<−$TR_3$ and R(i, j)−R(i, j−2)<−$TR_3$ then replace R(i, j) with the mean of R(i, j+2), R(i+2, j), G(i−1, j) and G(i, j−1).

As one example, the third threshold value $TR_3$ is set at 80 in a 0-255 color format. The dark red pixel is compared to four neighboring red pixels. If the difference between the red pixel and all four neighboring red pixels is less than the third threshold amount, the red pixel is replaced with the mean of four nearby pixels. Thus, dark red pixels are preferably treated differently then bright red pixels. This is because it is generally permissible to detect dark red pixels by testing only against neighboring red pixels, since fine details not adversely affected by brightening dark red pixels. Furthermore, black/white transitions tend to pick up a false red edge if more neighboring reds are not used in the test. Again, the majority of tests are performed down and to the right of the current pixel to prevent propagating errors from previously corrected lines. Note also that the replacement operation is preferably the mean for dark red pixels and that it is not desirable to check for flatness for very dark red pixels.

Returning now to method 700, the next step 712 is to replace moderately dark red pixels that that are less than each selected neighboring pixel by a fourth threshold difference with a mean of selected nearby pixels if nearby pixels are locally flat. For example, step 712 can be performed with the following procedure where $TR_4$ is the fourth threshold value and R(i, j) is the red pixel being evaluated:

If R(i, j)−R(i, j+2)<−$TR_4$ and R(i, j)−R(i+2, j+2)<−$TR_4$ and R(i, j)−R(i+2, j)<−$TR_4$ and R(i, j)−R(i, j−2)<−$TR_4$ and $LF_R$ is true, then replace R(i, j) with the mean of R(i, j+2), R(i+2; j), G(i−1, j) and G(i, j−1).

As one example, the fourth threshold value $TR_4$ is set at 40 in a 0-255 color format. The moderately red pixel is again compared to four neighboring red pixels. If the difference between the red pixel and all four neighboring red pixels is less than the fourth threshold amount, and the area is locally flat, the red pixel is replaced with the mean of four nearby pixels. Thus, moderately red pixels are only replaced if the area is also locally flat.

It should be noted that while this detailed example of red pixel replacement uses many of the same neighboring pixels and the same threshold values in evaluating and replacing both bright and dark red pixels, that in many cases it would be desirable to use different combinations of pixels for bright and dark and different threshold values for bright and dark. Typically, such values would again be determined by simple experiments on the visibility of single bright or dark pixels on a flat field.

Turning now to FIG. 8, a third exemplary pixel array 600 is illustrated. Again, the pixel array 800 is a Bayer pattern, which places red, green and blue filters over the pixels in a checkerboard pattern that has twice the number of green squares as red or blue. In the pixel array 800, the exemplary blue pixel B(i, j) is the pixel that is to be evaluated, and the various other neighboring and nearby pixels are identified by their color and relative displacement from the blue pixel B(i, j). For example, the green pixel G(i, j+1) is the green pixel next to the blue pixel B(i, j), and the green pixel G(i+1, j) is the green pixel below the blue pixel B(i, j).

Figure 9:
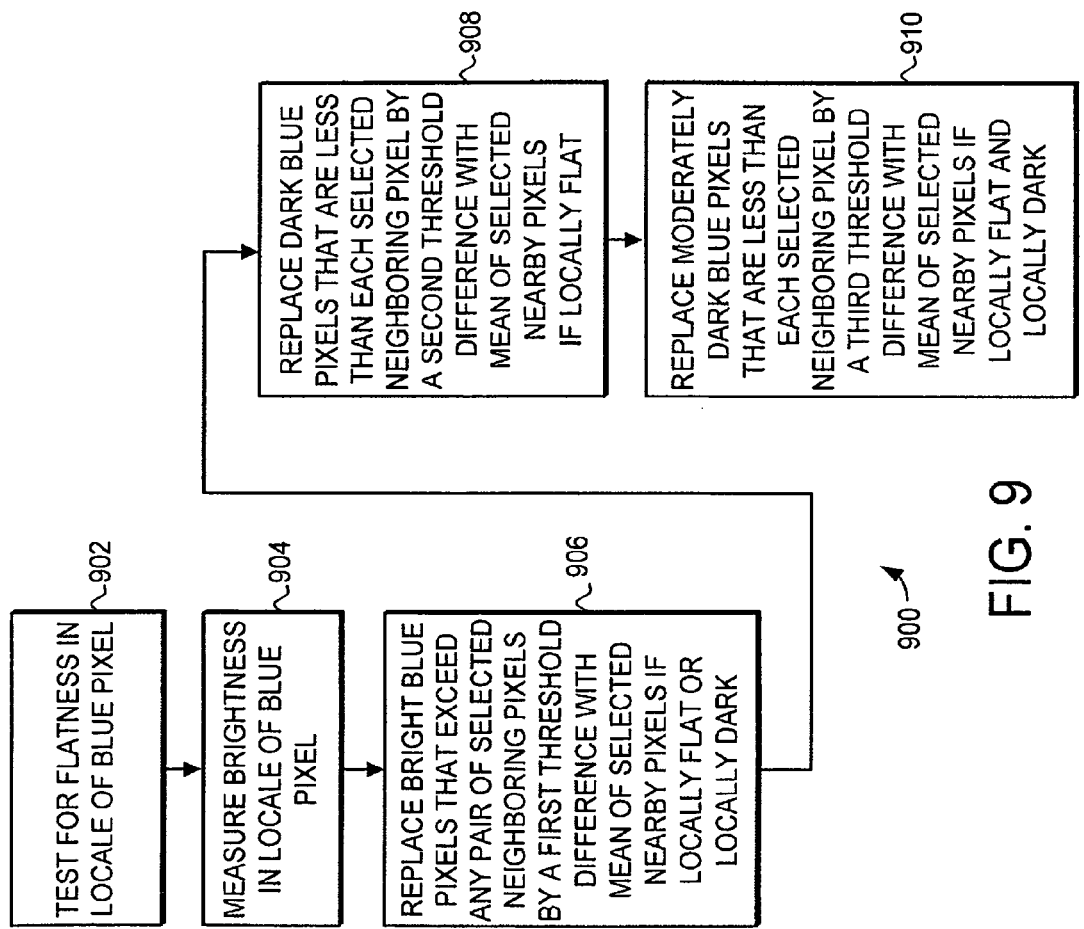
FIG. 9 is a flow diagram illustrating a bad blue pixel replacement method in accordance with an embodiment of the invention.

The exemplary pixel array 800 will be used to illustrate an exemplary blue pixel replacement procedure. Turning now to FIG. 9, a flow diagram illustrates a method 900 for bad pixel replacement of blue pixels. In general, a different strategy is desirable for blue pixels for several reasons. First, the blue channel tends to be noisier than the red and green channels due to sensor physics. Furthermore, the blue color channel has the least importance in representing spatial image details. Therefore, a more aggressive bad blue detection is useful to remove a number of bright blue bad pixels with little compromise of sharpness.

The first step 902 of method 900 is to test for flatness in the local of the blue pixel. When local flatness is found, a more aggressive threshold can be used to replace bright blue pixels without unwanted loss of detail. In general, flatness occurs when the maximum difference between pixels in the area is below a defined threshold. For example, local flatness around blue pixel B(i, j) can be defined by the procedure:

If max (G(i−1, j), G(i, j+1), G(i+1, j+2), G(i+2, j+1), G(i+1, j), G(i, j−1))−min (G(i−1, j), G(i, j+1), G(i+1, j+2), G(i+2, j+1), G(i+1, j), G(i, j−1))<$LFT_B$ where $LFT_B$ is the local flatness threshold for blue, then the local flatness value $LF_B$ is set to true. As one example, the local flatness threshold $LFT_B$ is set to 40 in a 0-255 color format. Again, this is just one example of how local flatness can be determined.

The next step 904 is measure brightness in the locale of the blue pixel. Measuring brightness in the locale of the blue pixel allows for a more aggressive replacement of moderately bright blue pixels without loss of detail. In general, measuring brightness involves measuring the brightness of pixels surrounding the blue pixel of interest. For example, measuring local brightness around blue pixel B(i, j) can be done by calculating the mean of pixels G(i−1, j), G(i, j+1), G(i+1, j) and G(i, j−1), setting that mean equal to a local brightness $B_{avg}$. Of course, other pixels could be used to determine the local brightness.

The next step 906 is to replace bright blue pixels that exceed any pair of selected neighboring pixels by a first threshold difference with a mean of selected nearby pixels if the area is locally flat or locally dark. In performing such a replacement a variety of different neighboring and nearby pixels could be selected to serve as the basis for blue pixel replacement. For example, step 906 can be performed with the following procedure where $TB_1$ is the first threshold value, DKR is the dark threshold value and B(i, j) is the blue pixel being evaluated:

If (B(i, j)−B(i, j+2)>$TB_1$ and B(i, j)−B(i+2, j)>$TB_1$) or (B(i, j)−B(i, j+2)>$TB_1$ and B(i, j)−B(i+2, j+2)>$TB_1$) or (B(i, j)−B(i, j+2)>$TB_1$ and B(i, j)−B(i+2, j)>$TB_1$) and ($LF_B$ is true or $B_{avg}$<DKR then replace B(i, j) with the mean of B(i, j+2), B(i+2, j+2), B(i+2, j) and B(i, j−2).

As one example, the first threshold value $T_1$ is set at 13 and DKR is set at 80 in a 0-255 color format. In this exemplary procedure, the blue pixel is compared to three pairs of neighboring blue pixels. If the difference between any pair of blue pixels is greater than the threshold amount, and the area is locally flat or locally dark, the blue pixel is replaced with the mean of four nearby pixels. This method replaces very blue very aggressively to remove the effects of noise, with little compromise on sharpness.

Returning now to method 900, the next step 908 is to replace dark blue pixels that are less than each selected neighboring pixel by a second threshold difference with a mean of selected nearby pixels if locally flat. For example, step 908 can be performed with the following procedure where $TB_2$ is the second threshold value and B(i, j) is the blue pixel being evaluated:

If B(i, j)−B(i, j+2)<−$TB_2$ and B(i, j)−B(i+2, j)<−$TB_2$ and B(i, j)−B(i, j−2)<−$TB_2$ and $LF_B$ is true, then replace B(i, j) with the mean of B(i, j+2) and B(i+2, j).

As one example, the second threshold value $TB_2$ is set at 80 in a 0-255 color format. The dark blue pixel is compared to three neighboring blue pixels and the area is tested for local flatness. If the difference between the blue pixel and all three neighboring blue pixels is less than the second threshold amount, and the area is locally flat, the blue pixel is replaced with the mean of two nearby pixels. This procedure prevents the tendency for correction to cause a blue profile to appear around black objects immersed in a white background that would otherwise reduce highlights in outdoor images of white details. Specifically, for dark blue pixels the detection is more cautious by only using previously untested neighbors.

Returning now to method 900, the next step 910 is to replace moderately dark blue pixels that are less than each selected neighboring pixel by a third threshold difference with a mean of selected nearby pixels if nearby pixels are locally flat and locally dark. For example, step 910 can be performed with the following procedure where $TB_3$ is the third threshold value and B(i, j) is the red pixel being evaluated:

If B(i, j)−B(i, j+2)<−$TB_3$ and B(i, j)−B(i+2, j)<−$TB_3$ and B(i, j)−B(i, j−2)<−$TB_3$ and $LF_B$ is true and $B_{avg}$<DKR, then replace B(i, j) with the mean of B(i, j+2) and B(i+2, j).

As one example, the third threshold value $TB_3$ is set at 40 and the dark threshold DKR is set at 120 in a 0-255 color format. The moderately dark blue pixel is again compared to three neighboring blue pixels. If the difference between the blue pixel and all three neighboring blue pixels is less than the second threshold amount, and the area is locally flat and locally dark, the blue pixel is replaced with the mean of two nearby pixels. The use of both a flatness and brightness test helps prevent bluing of dark shadows next to bright white objects.

It should be noted that while this detailed example of blue pixel replacement uses many of the same neighboring pixels and the same threshold values in evaluating and replacing both bright and dark blue pixels, that in many cases it would be desirable to use different combinations of pixels for bright and dark and different threshold values for bright and dark. Typically, such values would again be determined by simple experiments on the visibility of single bright or dark pixels on a flat field.

As one example, the first threshold value $TG_1$ is set at 40 in a 0-255 color format. In this exemplary procedure, the green pixel is compared to six neighboring green pixels. If the difference between the green pixel and all six neighboring green pixels is greater than the threshold amount, the green pixel is replaced with an average of four nearby pixels. This provides a fairly aggressive pixel replacement that does not compromise much visible high spatial frequency detail. The procedure looks at the four nearest green neighbors, plus two additional pixels below and to the right of the pixel of interest. This is generally preferable, as left and upward pixels may have already been corrected and can lead to propagating errors moving down the image.

It also should be noted that methods 500, 700 and 900 would typically be implemented in ASIC that receives the image data as a stream of pixels. For example, receiving, the ASIC can receive a portion of a row in the image at a time. As pixels are added, the ASIC processes the received pixels, comparing each pixel to selected neighboring pixels and replacing bad pixels as detected. The bad pixel algorithm suitably operates on the Bayer pixel array just prior to the interpolation step. The pixels are being received from the camera continuously, in a row-wise fashion. In order to detect bad pixels, and in order to assign an R, G, and B value to every pixel location in the Bayer array (interpolation), it is desirable to compare pixels in one image row with pixels to the left and right, as well as in a number of other rows. For this reason, it is desirable to store one or more lines of pixel values in a memory circuit. This is an expensive process in terms of circuit area, complexity, and read-write time delay. However, if the reads and writes are performed just once, and both the bad pixel corrections and the interpolations are performed on the same pixels that have been read, then there is at least an economical use of the memory and the time-consuming read/write cycles. Accordingly, bad pixel correction is a reasonably economical addition to the interpolation part of the circuit.

As stated above, the image processor also corrects for roll-off in image data by determining for each pixel a roll-off contour in which the pixel resides and adjusting that pixel based upon its roll-off contour. In one embodiment, the image processor provides three different types of roll-off correction. Specifically, the image processor provides roll-off correction for luminance, color and MTF in the image. In general, there is a tradeoff in digital cameras between the cost, size and quality of optics. In some cameras, the height of optical module is limited, resulting in high angle of incidence at the corners and sides of a sensor. Pixels at the sides and corners receive less light, and the increased spot size and scattering can cause noticeable loss of image quality toward the edges of the image. This is generally referred to as "roll-off" variability, and can affect the luminance, color and MTF of the image to varying degrees. The image processor provides the ability to compensate for the effects of roll-off using digital processing techniques, with those techniques providing an optimized correction for the different types of roll-off variability.

Figure 10:
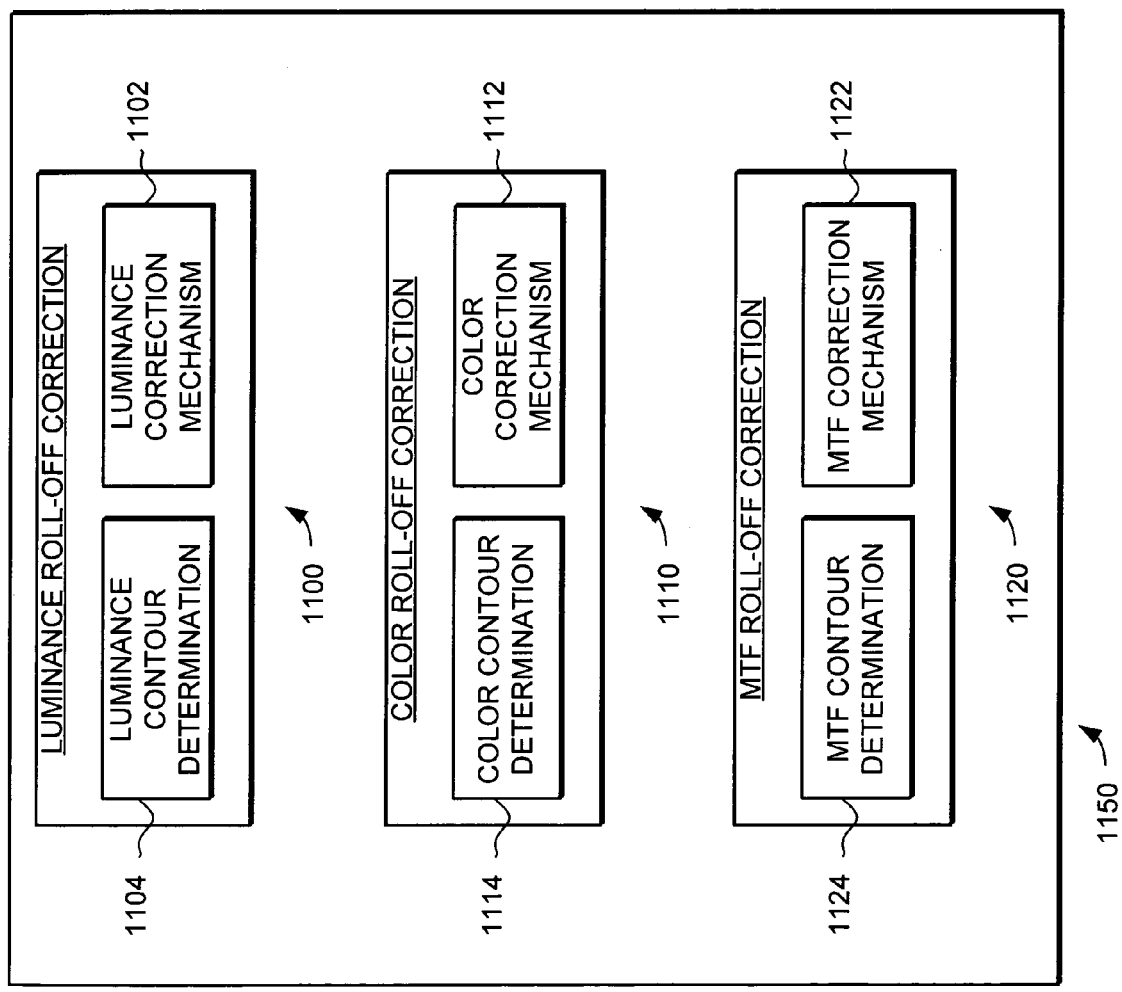
FIG. 10 is a schematic view of a luminance roll-off correction device, color roll-off-correction device, and MTF roll-off correction device in accordance with an embodiment of the invention.

Turning now to FIG. 10, exemplary roll-off correction modules 1150 are illustrated. Specifically, an exemplary luminance roll-off correction module 1100, an exemplary color roll-off correction module 1110, and an exemplary MTF roll-off correction module 1120 are illustrated in more detail. Each roll-off correction device performs its respective roll-off correction based a respective plurality of roll-off contours. Specifically, for each pixel in the image a roll-off contour in which the pixel resides is determined. The luminance, color and/or MTF of each pixel are then corrected by an amount that is determined by the pixel's contour. When all the pixels are so corrected the roll-off variability of the image is reduced.

The contours are designed to emulate the roll-off variability in the image, and thus provide a basis for correction of the roll-off variability. As such, the shape of plurality of contours is preferably customizable to facilitate good emulation of the roll-off as it occurs in the optical device. This provides for effective correction of roll-off variability. As one example, the different contours could be made available to the system for section by the host processor of the device featuring roll-off compensation at startup. Furthermore, it should be noted that the roll-off variability for luminance, color and MTF would typically not comprise the same pattern. Thus, the roll-off contours used for correction of these different types of variability would preferably use different roll-off contours optimized to correct the corresponding variability.

Preferably, each roll-off correction module defines contours for a corresponding roll-off correction in which determination of each respective pixel's roll-off contour uses a relatively low amount of computing resources. For example, the roll-off correction module can define roll-off contours as sets of linear segments that together form a closed contour around an area of the image. This facilitates determination of roll-off contour and subsequent pixel adjustment of luminance, color and/or modulation transform function while requiring relatively low computing resources.

The luminance roll-off correction module 1100 includes a luminance contour determination module 1104 and a luminance correction mechanism 1102. The luminance roll-off correction module 1104 receives pixel data and determines a roll-off contour for each pixel. Specifically, it determines which of a plurality of roll-off contours corresponds to a particular pixel. Calculating which roll-off contour corresponds to a particular pixel can involve several distinct steps.

For example, in some cases it may be desirable to first compensate for offsets in the optical axis. Specifically, it is desirable to center the roll-off contours with the center of the optical axis. In some cases the center of image is offset from the optical axis. To compensate for this, the row and column information for each pixel can be adjusted to make it relative to the actual effective optical axis of the camera optics instead of the image center. This compensates for vertical or horizontal misalignment of the optical axis with the center of the image data. Thus, roll-off correction can be done according to the pixels' relative location from the optical axis itself, and thus can better compensate for roll-off in the image.

After compensating for optics center offset, the luminance contour determination module determines the contour of the pixel. As stated above, the luminance roll-off correction module preferably defines contours which require a relatively low amount of computing resources to determine which contour a pixel resides in. For example, the roll-off correction module can define roll-off contours as sets of linear segments that together form a closed contour around an area of the image.

Many computations create closed curves around an origin or optical center, however, most common methods involve complex calculations, yet provide a limited variety of shapes. For example, a well known curve of this type is the ellipse, defined by $a*x^2+b*y^2=c$. The method for creating this type of curve can entail difficult and computationally expensive functions such as squares and square root of a difference. Furthermore, the ellipse has a particular shape, which may, or may not correctly match the shape of the contours of equal luminance. If not correctly matched in shape, the contours of the correction algorithm do not completely equalize the luminance of the image.

The shape of the contours of luminance can, for example, be determined by capturing the image of a very uniformly illuminated gray or white surface. Then the image should be analyzed, and a set of contours plotted to connect points of equal luminance. It will then be found that some optical/sensor systems produce circular contours, some produce oval contours, and some produce other oblong shapes. The shape is the result, in general, of the exact geometry of the conductors and semi-conducting elements that make up the individual pixels of the sensor, as well as the bending and scattering of light from, such various obstructions. Because the opaque metal circuit lines lie above the sensing elements, and because they run in 'Manhattan' geometry, the light available to the sensing area often varies in such a manner that contours of equal luminance may tend to run parallel to the vertical and horizontal edges of the imaging sensor. Thus the contours are not expected to be, and do not generally occur, as pure ellipses.

An advantage of the roll-off correction procedures described herein is the ability to create fairly arbitrary convex curves defined as a series of a few straight line segments. Together the line segments can approximate a contour shape that corresponds well to the roll-off variability being corrected. For example they can run fairly parallel to the image edges, unlike elliptical contours, although elliptical contours are also possible. It should be noted that the obtuse corners that occur at the junctions of the line segments typically do not create excessive visible artifacts in the finished images. The mathematical inequalities used to determine the contours can be determined from the mathematical slopes of the straight lines joining the origin to the different vertices. In general, it is desirable to construct these inequalities with simple integer coefficients to minimize the computations. This imposes a minor constraint on the positioning of the vertices. In three examples given below in equations 2, 3 and 4, the value of the contour, along a given line segment, is determined from the slope of that line segment. The most advantageous slopes are those that permit simple computations, and this also imposes a minor constraint on the positioning of the vertices.

Although the example equations given below use only convex curves, it is also possible to create concave regions within generally convex curves by this method. For example, it is possible to create a pinched oval contour by using two points of origin on opposite sides of the origin. Again, diagonal rays are drawn radiating from each point of origin to find the coefficients of the linear inequalities which generate each half of the pinched oval contours. The equations will now appear with added constant offset coefficients. Essentially a partial oval is thus created on each side of the optical origin, and the two ovals join along the line which is the perpendicular bisector of the straight line joining the two points of origin. Even more complex curves are possible to approximate possible contours.

Three specific examples of roll-off contour determination procedures for a pixel are given by equations 1, 2, 3 and 4 below. Equation 1 defines offset variables x and y for a pixel identified by its column (C) and row (R):

$$x = abs(C - C0)$$
$$y = abs(R - R0) \quad (1.)$$

where C0 and R0 is the optical axis for luminance. Equation 1 thus defines x and y for a pixel as the absolute value of the difference between the column and row of a pixel and the optical center. Equation 1 thus serves to compensate for vertical or horizontal misalignment of the optical axis with the center of the image data. So defined, x and y can be used to determine the roll-off contour RC of the pixel. The use of the absolute value allows all four quadrants of the image surrounding the optical axis to be handled using the same circuits for computations according to equations 2, 3, and/or 4. Several different techniques can be used to determine a roll-off contour from x and y. As a first example, equation 2 describes a procedure to determine the roll-off contour RC from x and y:

$$\begin{aligned} &\text{if} \\ &x > 4y \\ &\text{then} \\ &RC = \frac{5x}{4} \\ &\text{else if} \\ &x > 2y \\ &\text{then} \\ &RC = x + y \\ &\text{else} \\ &RC = \frac{x}{2} + 2y \end{aligned} \quad (2.)$$

Figure 11:
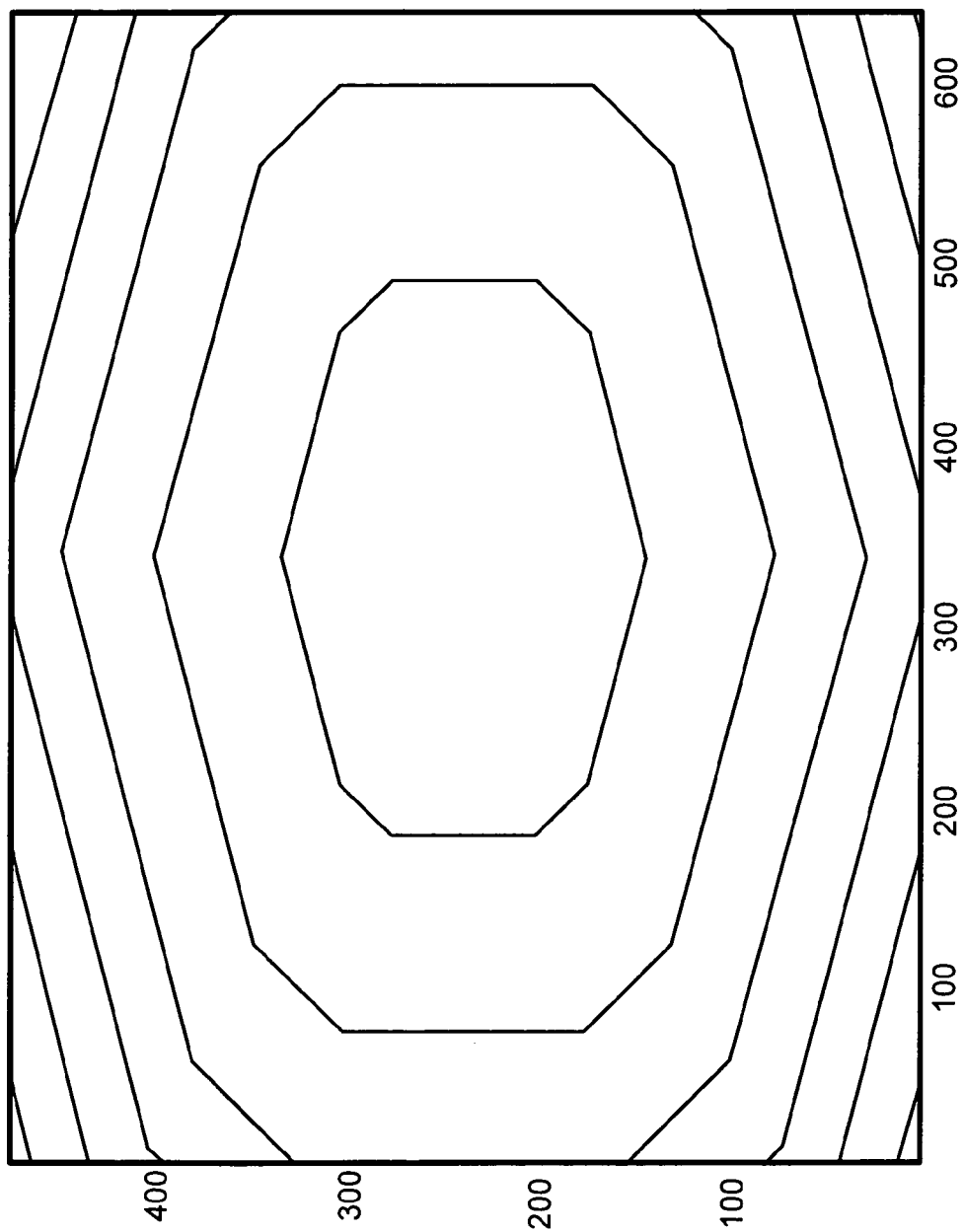
FIGS. 11, 12 and 13 are graphical views of exemplary roll-off contours in accordance with an embodiment of the invention.

Equation 2 defines each roll-off contour as a set of linear segments. The roll-off contour defined by equation 2 is an oval-type pattern made up of these linear segments. Furthermore, each of these linear segments is selected to be computationally efficient. For example, multiplying x by 5 can be done with one register shift two places to the left and one addition operation. Turning now to FIG. 11, a graph 1150 illustrates an exemplary plurality of roll-off contours defined by equation 2. For example, when a pixel has x greater than 4y, the roll-off contour RC of the pixel is defined by 5x/4. This corresponds to the vertical linear segments of the oval contour. Likewise, when a pixel has x greater than 2y, the roll-off contour RC of the pixel is defined by x+y. This corresponds to linear segments having a slope of ±1. Otherwise, the roll-off contour RC of the pixel is defined by x/2+2y. This corresponds to the linear segments having a slope of ±¼. Taken together, the three types of linear segments define a roll-off contour that approximates an oval while requiring relatively low computational requirements for contour determination. It should be noted that while this example uses three types of segments to define each contour, other applications can use more or less number of segments. Typically, the number of segments used would depend upon the additional processing complexity versus any potential benefit in emulating luminance roll-off. It should also be noted that in some cases it may be desirable to scale RC to make changes appropriately smooth. For example, RC can be scaled by dividing the RC computed according to equation 2 by an integer such as 8 or 4.

As second example of roll-off contours, equation 3 describes another procedure to determine the roll-off contour RC from x and y:

if (3.)

$x > y$ then $RC = x + \frac{y}{2}$ else $RC = \frac{x}{2} + y$

Figure 12:
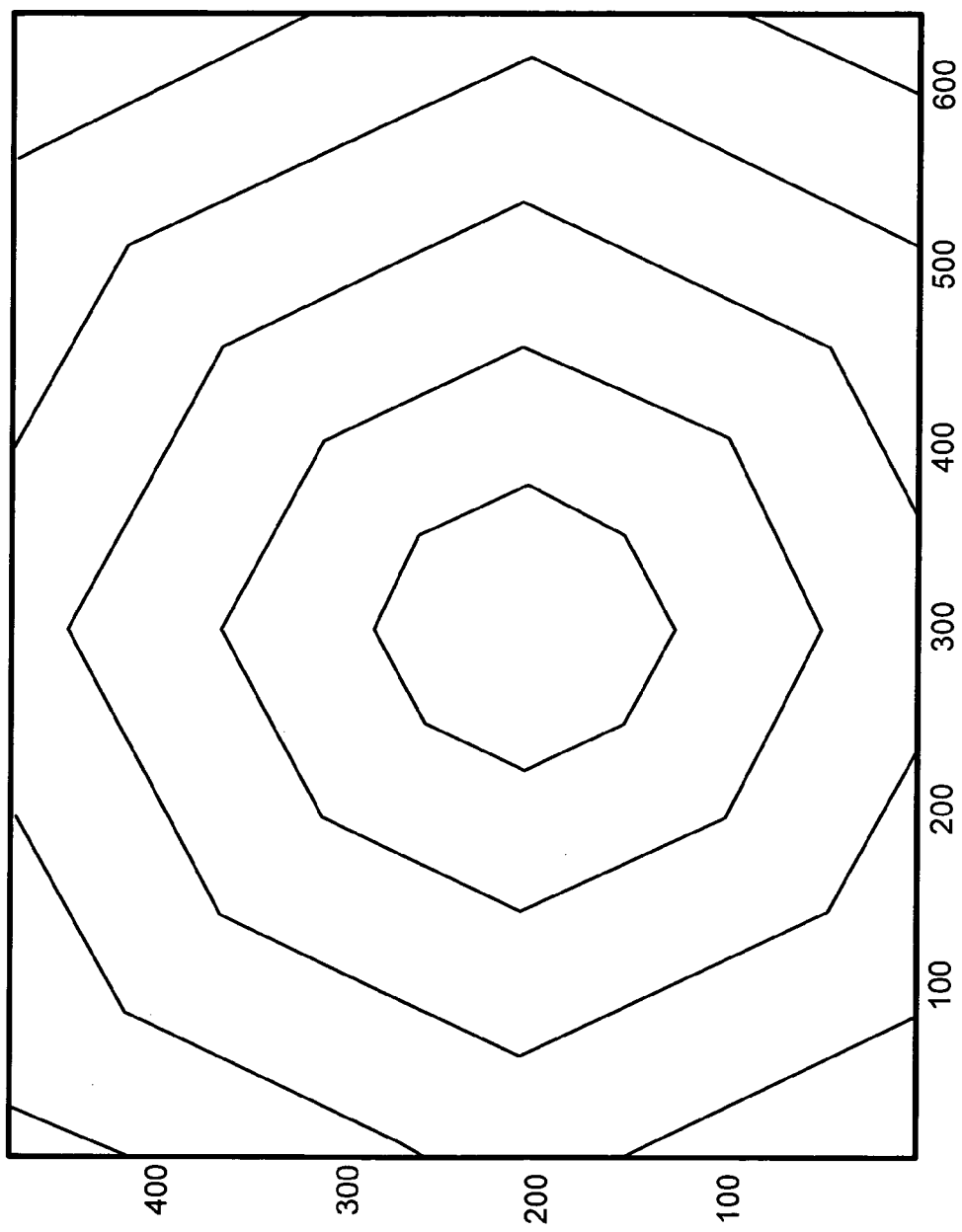

Equation 3 again defines each roll-off contour as a set of linear segments that are selected to be computationally efficient. The roll-off contour defined by equation 3 is a circular-type pattern made up of these linear segments. Turning now to FIG. 12, a graph 1200 illustrates an exemplary plurality of roll-off contours defined by equation 3. For example, when a pixel has x greater than y, the roll-off contour RC of the pixel is defined by x+y/2. This corresponds to the linear segments of the circular contour that have a slope of ±2. Otherwise, the roll-off contour RC of the pixel is defined by x/2+y. This corresponds to the linear segments having a slope of ±½. Taken together, the two types of linear segments define a roll-off contour that approximates a circle while requiring relatively low computational requirements for contour determination. It should again be noted that while this example uses two types of segments to define each contour, other applications can use more or less numbers of segments. Typically, the number of segments used would depend upon the additional processing complexity versus any potential benefit in emulating luminance roll-off.

As a third example of roll-off contours, equation 4 describes yet another procedure to determine the roll-off contour RC from x and y:

if (4.)

Figure 13:
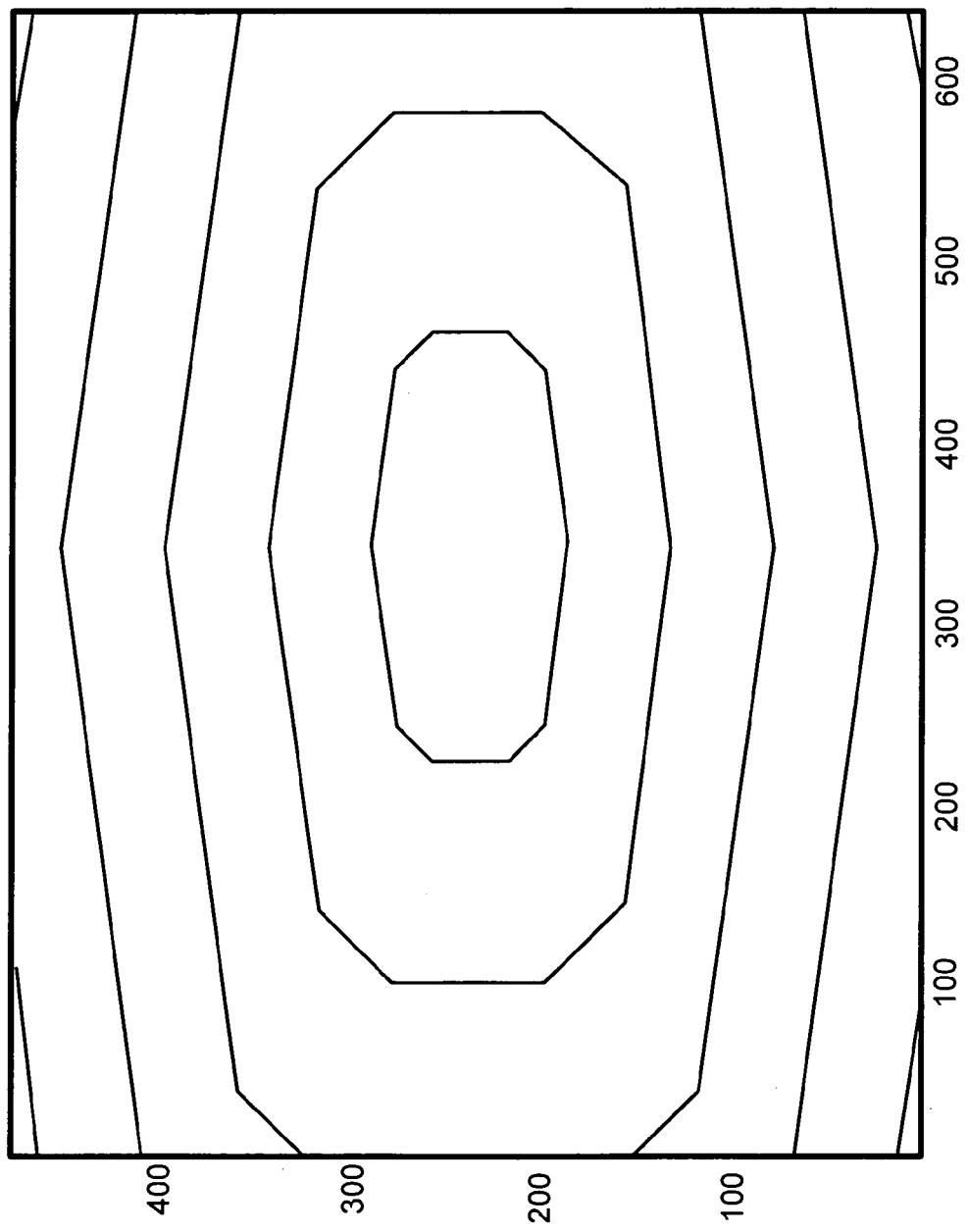

$x > 6y$ then $RC = \frac{7x}{16}$ else if $x > \frac{5y}{2}$ then $RC = \frac{3(y + x)}{8}$ else $RC = \frac{x}{8} + y$ Similarly as with respect to Equations 2 and 3, equation 4 defines each roll-off contour as a set of linear segments that are selected to be computationally efficient. The roll-off contour defined by equation 4 is a more oblong-type pattern made up of these linear segments. Turning now to FIG. 13, a graph 1300 illustrates an exemplary plurality of roll-off contours defined by equation 4. For example, when a pixel has x greater than 6y, the roll-off contour RC of the pixel is defined by 7x/16. This corresponds to the linear segments of the contour that have a slope of ±7/16. Otherwise, the roll-off contour RC of the pixel is defined by 3(y+x)/16 or x/8+8. Taken together, the three types of linear segments define a roll-off contour that has an oblong shape while requiring relatively low computational requirements for contour determination. It should again be noted that while this example uses three types of segments to define each contour, other applications can use more or less numbers of segments. Typically, the number of segments used would depend upon the additional processing complexity versus any potential benefit in emulating luminance roll-off.

Thus, using equation 1, and a plurality of roll-off contours such as those defined in equations 2, 3 or 4, the roll-off contour RC of each pixel can be determined. With the roll-off contour determined, the luminance correction mechanism 1102 provides correction of the pixel's luminance based on its contour. In one embodiment, the luminance correction mechanism includes a lookup table or similar database. In this embodiment the correction mechanism 1102 references the table by the roll-off contour corresponding to the pixel and returns a correction factor corresponding to that contour. The correction mechanism 1102 uses the returned correction factor to adjust the luminance of the pixel. Thus, when applied to all pixels of the image the luminance correction mechanism 1102 provides roll-off correction of the luminance based on each pixel's contour and the associated correction factor.

As one specific example, the correction factor for a luminance roll-off correction CF for a pixel can be defined as:

$$CF = \frac{3(RC)^2 - 1638}{128}$$ (5.)

where RC is the roll-off contour for the pixel, such as one determined using equation 2, 3 or 4. The luminance correction mechanism can then use the correction factor CF to adjust the luminance of the pixel by multiplying the current luminance value by the correction factor CF.

In a further variation, the luminance roll-off correction applied using the correction factor can be adjusted by a stepped attenuator. In this embodiment, the luminance correction can be scaled up or down in response to gross changes in average luminance. The stepped attenuator can use combinations of step function operations on the correction factor. For example, in one embodiment the stepped attenuator adjusts the correction factor by a process of shifting the correction factor according to equation 6:

$CF=(CF>>n)+(CF>>m)$ where $n=\{0,1\}$, $m=\{0,1,8\}$ (6.)

Thus, by increasing the step function as a function of contour, the correction factor can be appropriately scaled.

Returning to FIG. 10, the color roll-off correction module 1110 includes a color contour determination module 1114 and a color correction mechanism 1112. Again, the color roll-off correction module 1104 receives pixel data and determines a roll-off contour for each pixel. Specifically, the contour determination module 1114 determines which of a plurality of roll-off contours corresponds to a particular pixel. Calculating the roll-off contours for colors can use the same techniques described above with reference to luminance roll-off correction. Thus, the color roll-off can compensate for sensor axis offset and use roll-off contours such as defined in equations 1-4. However, in some cases it may be more desirable to use a circle-type contour such as that defined in equation 3.

With the roll-off contour for the pixel determined, the color correction mechanism 1112 provides correction of the pixel color based on which contour the pixel is in. In one embodiment, the luminance correction mechanism includes a lookup table or similar database. The table is referenced by the roll-off contour corresponding to the pixels, and returns a correction factor corresponding to that contour. The color correction mechanism 1112 uses the returned correction factor in adjusting the luminance of the pixel. Thus, when applied to all pixels the luminance correction mechanism 1112 provides roll-off correction of the color based on each pixel's contour and the associated correction factor.

When the pixel data is in a YCC format, the color roll-off is preferably accomplished by an additive, rather than multiplicative, location-dependent correction to both Cr and Cb color channels. It should also be noted that typically the contours for color nonuniformity, i.e., for Cb an Cr, are different from the contours for luminance non-uniformity correction. Thus the variety of contour shapes is generally desirable to achieve correction of all the image color components.

As one specific example, the correction factor for a color roll-off correction CF for a pixel can be defined as:

$$CF = RC - K \quad (7.)$$

where CR is the roll-off contour for the pixel, computed using an equation such as 2, 3 and 4. K is a system selectable constant, set a value such as 85. The correction factor CF can then be used to adjust the color of the pixel by multiplying the current color value by the correction factor CF.

Again, like the luminance roll-off correction, it may be desirable for the color roll-off correction to be adjusted with a step attenuator. In this variation, the color correction can scaled up or down in response to gross changes in color. The stepped attenuator can again use combinations of step function operations on the correction factor. In another embodiment, different look-up tables can be loaded and used to provide a scaled amount of correction.

Furthermore, in some cases it will be desirable to compensate for other spatial color variations with the color roll-off correction. This can be done by determining the spatial position of each pixel in the image, and then using that spatial position to determine spatial position correct factors used to further adjust the color of the pixel. For example, a horizontal spatial position correction factor $CF_H$ and a vertical spatial position correction factor $CF_V$ of a pixel can be defined by equation 8:

$$CF_H = \frac{(C - C0_C)}{8} \quad (8.)$$
$$CF_V = \frac{(R - R0_C)}{4}$$

where $C0_C$ and $R0_C$ is the optical axis for color, which it should be noted, can differ from the luminance optical axis used in equation 1. The spatial correction factors $CF_H$ and $CF_V$ can be used to correct for variability such as side to side or top to bottom color variability.

The spatial correction factors $CF_H$ and $CF_V$ are then combined with the roll-off correction factor CF using variety of techniques. For example, it can be combined using an additive process that adjusts the chrominance channels Cr and Cb of a pixel, resulting in adjusted chrominance channels Cr' and Cb' by:

$$Cr' = Cr + \frac{(CF * M_{CR} - CF_H * C_{CR} - CF_V * R_{CR})}{128} \quad (9.)$$
$$Cb' = Cb + \frac{(CF * M_{CB} - CF_H * C_{CB} - CF_V * R_{CB})}{128}$$

where $M_{CR}$ and $M_{CB}$ are roll-off correction constants, $C_{CR}$ and $C_{CB}$ are horizontal correction constants, and $R_{CR}$ and $R_{CB}$ are vertical correction constants. As example values, $M_{CR}$ can be equal to 20, $M_{CB}$ equal to −6, $C_{CR}$ equal to 5, $C_{CB}$ equal to 5, $R_{CR}$ equal to zero, and $R_{CB}$ equal to zero. This additive combination of roll-off and spatial correction results in an effective color correction for unwanted color variability.

In this embodiment of non-uniformity correction, the preferred implementation performs the roll-off corrections in $YC_bC_r$ (or YUV) space. However, the method of contour generation is still applicable in RGB space. The contours used are usually similar for all three colors, unlike the YUV decomposition, however, the method of inequalities employed is the same.

Returning to FIG. 10, the MTF roll-off correction module 1120 includes a MTF contour determination module 1124 and a MTF correction mechanism 1122. Again, the MTF roll-off correction module 1124 receives pixel data and determines a roll-off contour for each pixel. Specifically, MTF contour determination module 1124 determines which of a plurality of roll-off contours corresponds to a particular pixel. The roll-off contours for MTF can be calculated using the same techniques described above with reference to luminance and color roll-off correction. Thus, the MTF roll-off correction module 1120 can compensate for sensor axis offset and use roll-off contours as defined in equations 1-4. However, in many cases it will be desirable to use a circle-type contour such as that defined in equation 3.

With the roll-off contour determined, the MTF roll-off correction mechanism 1122 provides correction of the color based on the contour. In one embodiment, the MTF correction mechanism 1122 includes a lookup table or similar database. The MTF correction mechanism 1122 references the table by the roll-off contour corresponding to the pixels, and returns a correction factor corresponding to that contour. The MTF correction mechanism 1122 uses the returned correction factor in adjusting the MTF of the pixel. Thus, when applied to all pixels the MTF correction mechanism 1122 provides roll-off correction of the MTF based on each pixel's contour and the associated correction factor.

Because of noise amplification issues, it is desirable to perform MTF roll-off correction in a specific order of operations. Specifically, it is desirable to avoid serial application of luminance and MTF roll-off correction. Instead, the luminance roll-off correction is preferably applied in parallel with the MTF roll-off correction, and the MTF correction is added near the output, as was illustrated in FIG. 2.

As one specific example, the correction factor for a MTF roll-off correction CF for a pixel can be defined as:

$$CF = RC * K \quad (10.)$$

where RC is the roll-off contour for the pixel, computed using an equation such as 2, 3 and 4. K is a system selectable constant. The correction factor CF can then be used to adjust the MTF of the pixel by multiplying the current MTF value by the correction factor CF.

Furthermore, in some cases it will be desirable to compensate for MTF variations with the MTF roll-off correction.

This can be done by combining the MTF roll-off correction with edge convolution. Edge convolution is used sharpen the edges of shapes in the image data. As one example, edge convolution can be performed using equation 11:

$$E = conv\frac{(m, Y)}{16} \quad (11.)$$

where $$m = \begin{bmatrix} -1 & -2 & -1 \\ -2 & 12 & -2 \\ -1 & -2 & -1 \end{bmatrix}$$

and where Y equals the luminance component of the pixel data. That is, after interpolation we have R, G and B values at every pixel point. We combine these color values according to their brightness, for example Y~0.5G+0.3R+0.2B. Thus, the luminance is a color space conversion of the RGB data which gives a good representation of the brightness of a pixel. The edge convolution output E is then combined with MTF roll-off correction by:

$$E' = +\frac{\left(\frac{(E*B)}{8}\right) + \left(\frac{(E*CF*M_{MTF})}{4}\right)}{128} \quad (12.)$$

where $M_{MTF}$ is a roll-off correction constant and B is a base correction constant. As example values, $M_{MTF}$ can be equal to 8 and B can be equal to 8. The resulting edge convolution output E' can then be added to the luminance value Y to result in corrected luminance for each pixel. It should be noted that image sharpness is a generally desirable attribute. It is generally possible to increase the sharpness uniformly across the whole image using the edge convolution. The above method can use the set of contours to define a pattern of increasing blurriness as we move toward the edge of the image. This can be used to compensate for the greater sharpness that occurs at the optical axis, with increasing blurriness at the outer regions, a limitation that is commonly a problem in inexpensive optics. Using the oval contour patterns and edge convolution the method can add a controlled, progressively increasing amount of edge convolution for each contour farther from the center of the image.

Thus, the present invention provides a system and method for processing a digital image. The system and method processes image data by replacing bad pixel data and correcting for roll-off variability in the digital image. This improves the quality of the image and reduces the effects of defects in the image sensor. Specifically, the system and method replaces bad pixel data in the image data by comparing each pixel to selected neighboring pixels, including pixels of other colors in some cases, and determining if the pixel is likely corrupt, such as from a detective pixel. Corrupted pixels are then replaced using averages, means, maximums, or other statistical functions of select nearby pixels. The system and method provides improvement over traditional pixel replacement by analyzing and replacing individual pixels differently depending on their color, luminance and the color and luminance of neighboring pixels. This results in bad pixel replacement that can aggressively replace pixels that are likely to be problematic to the viewer while still maintaining good detail in the image. The system and method corrects for roll-off in image data by determining for each pixel a roll-off contour in which the pixel resides and adjusting that pixel based upon its roll-off contour, which in turn, depends upon its location on the image plane. This roll-off correction can include correction for unwanted variability in luminance, color, and/or modulation transfer function (MTF). The system and method defines contours used for roll-off correction in a way that facilitates determination of each pixel's roll-off contour using relatively low amount of computing resources. For example, the system and method can define the roll-off contours as sets of linear segments that together form a closed contour around an area of the image. This facilitates determination of roll-off contour and subsequent pixel adjustment of luminance, color and/or modulation transform function while requiring relatively low computing resources.

The system and method is thus able to replace bad pixel data and correct for roll-off variability in the digital image in an effective and efficient manner, and thus improve can improve the quality of the image and reduce the effects of defects in the image sensor.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A method of processing a digital image in a processor tangibly embodying a program of instructions to perform method steps, the method comprising the steps of:

receiving image data defining the image, the image data including a plurality of pixels, the plurality of pixels including a plurality of green pixels, a plurality of red pixels, and a plurality of blue pixels;

determining for each pixel if the pixel is likely corrupt by comparing each pixel to a plurality of neighboring pixels, wherein the step of determining for each pixel if the pixel is likely corrupt by comparing each pixel to a plurality of neighboring pixels comprises:

for each of the plurality of green pixels:
    determining if the green pixel exceeds a plurality of green-neighboring pixels by a first green threshold difference;
    determining if the green pixel is less than the plurality of green-neighboring pixels by a second green threshold difference;

for each of the plurality of red pixels:
    determining if the red pixel exceeds a plurality of red-neighboring pixels by a first red threshold difference;
    determining if the red pixel is less than the plurality of red-neighboring pixels by a second red threshold difference;
    determining if an area around the red pixel is locally flat by determining a maximum difference in neighboring green pixels and comparing the maximum difference in neighboring green pixels to a first local flatness threshold;
    determining if the area of the red pixel is locally dark by determining a brightness in neighboring green pixels and comparing the brightness to a first brightness threshold; and for each of the plurality of blue pixels:

determining if the blue pixel exceeds a pair of a plurality of blue-neighboring pixels by a first blue threshold difference;

determining if the blue pixel is less than a pair of the plurality blue-neighboring pixels by a second blue threshold difference;

determining if an area around the blue pixel is locally flat by determining a maximum difference in neighboring green pixels and comparing the maximum difference in neighboring green pixels to a second local flatness threshold;

determining if the area of the blue pixel is locally dark by determining a brightness in neighboring green pixels and comparing the brightness to a second brightness threshold; and replacing each pixel determined to be likely corrupt with a statistical function of a plurality of nearby pixels.

2. The method of claim 1 wherein the step of replacing each pixel determined to be likely corrupt with a statistical function of a plurality of nearby pixels comprises replacing the pixel with an average of the plurality of nearby pixels.

3. The method of claim 1 wherein the step of replacing each pixel determined to be likely corrupt with a statistical function of a plurality of nearby pixels comprises replacing the pixel with a maximum of the plurality of nearby pixels.

4. The method of claim 1 wherein the step of replacing each pixel determined to be likely corrupt with a statistical function of a plurality of nearby pixels comprises replacing the pixel with a mean of the plurality of nearby pixels.

5. The method of claim 1
wherein the step of replacing each pixel determined to be likely corrupt with a statistical function of a plurality of nearby pixels comprises replacing each green pixel determined to be likely corrupt with an average of a plurality of nearby pixels.

6. The method of claim 5 wherein the plurality of green-neighboring pixels comprise four closest green pixels and wherein the step of replacing each pixel determined to be likely corrupt with a statistical function of a plurality of nearby pixels comprises replacing green pixels determined to be likely corrupt with an average of the four closest green pixels.

7. The method of claim 1
wherein the step of replacing each pixel determined to be likely corrupt with a statistical function of a plurality of nearby pixels comprises replacing each red pixel determined to be likely corrupt with a statistical function of a plurality of nearby pixels.

8. The method of claim 7 wherein the plurality of red-neighboring pixels comprise two green pixels and two red pixels and wherein the step of replacing each pixel determined to be likely corrupt with a statistical function of a plurality of nearby pixels comprises replacing red pixels determined to be likely corrupt with a mean of two green pixels and two red pixels.

9. The method of claim 7 wherein the statistical function of a plurality of nearby pixels comprises a maximum of the plurality of nearby pixels if the red pixel exceeds the plurality of neighboring pixels by the first red threshold difference, and wherein the statistical function of a plurality of nearby pixels comprises a maximum of the plurality of nearby pixels if the red pixel exceeds the plurality of neighboring pixels by the first red threshold difference and if the red pixel is in a locally flat area or a locally dark area, and wherein the statistical function of a plurality of nearby pixels comprises a mean the plurality of nearby pixels if the red pixel is less than the plurality neighboring pixels by the second red threshold difference, and wherein the statistical function of a plurality of nearby pixels comprises a mean of the plurality of nearby pixels if the red pixel is less than the plurality neighboring pixels by the second red threshold difference and if the red pixel is in a locally flat area.

10. The method of claim 1
wherein the step of replacing each pixel determined to be likely corrupt with a statistical function of a plurality of nearby pixels comprises replacing each blue pixel determined to be likely corrupt with a statistical function of a plurality of nearby pixels.

11. The method of claim 10 wherein the plurality of blue-neighboring pixels comprise four blue pixels, and wherein the step of replacing each pixel determined to be likely corrupt with a statistical function of a plurality of nearby pixels comprises replacing blue pixels determined to be likely corrupt with a mean of four blue pixels.

12. The method of claim 10 wherein the statistical function of a plurality of nearby pixels comprises a maximum of the plurality of nearby pixels if the blue pixel exceeds the plurality of neighboring pixels by the first blue threshold difference and if the blue pixel is in a locally flat area or a locally dark area, and wherein the statistical function of a plurality of nearby pixels comprises a mean of the plurality of nearby pixels if the blue pixel is less than the plurality neighboring pixels by the second blue threshold difference and if the blue pixel is in a locally flat area, and wherein the statistical function of a plurality of nearby pixels comprises a mean of the plurality of nearby pixels if the blue pixel is less than the plurality neighboring pixels by the second blue threshold difference and if the blue pixel is in a locally flat area and if the blue pixel is in a locally dark area.

13. A method of processing an a digital image in a digital camera, the method comprising the steps of:
generating image data defining the image with the digital camera, the image data including a plurality of pixels;
for each green pixel in the plurality of pixels, replacing likely corrupt green pixels by:
determining if a green pixel exceeds first selected green-neighboring pixels by a first green threshold difference and replacing the green pixel with an average of first selected green-nearby pixels if the green pixel exceeds the first selected green-neighboring pixels by the first green threshold difference; and
determining if the green pixel is less than second selected green-neighboring pixels by a second green threshold difference and replacing the green pixel with an average of selected green-nearby pixels if the green pixel is less than the second selected green-neighboring pixels by the second green threshold difference; and
for each red pixel in the plurality of pixels, replacing likely corrupt red pixels by:
determining if a red pixel exceeds first selected red-neighboring pixels by a first red threshold difference and replacing the red pixel with a maximum of first selected red-nearby pixels if the red pixel exceeds the first selected red-neighboring pixels by the first red threshold difference; and
determining if the red pixel exceeds second selected red-neighboring pixels by a second red threshold difference and determining if the red pixel is in a locally flat area and determining if the red pixel is in a locally dark area and replacing the red pixel with a maximum of second selected red-nearby pixels if the red pixel exceeds the second selected red-neighboring pixels by the second red threshold difference and if the red pixel is in a locally flat area or a locally dark area; and determining if the red pixel is less than third selected red-neighboring pixels by a third red threshold difference and replacing the red pixel with a mean of third selected red-nearby pixels if the red pixel is less than the third selected red-neighboring pixels by the third red threshold difference; and determining if the red pixel is less than fourth selected red-neighboring pixels by a fourth red threshold difference and determining if the red pixel is in a locally flat area and replacing the red pixel with a mean of fourth selected red-nearby pixels if the red pixel is less than the fourth selected red-neighboring pixels by the fourth red threshold difference and if the red pixel is in a locally flat area; and for each blue pixel in the plurality of pixels, replacing likely corrupt blue pixels by:

determining if a blue pixel exceeds any pair of first selected blue-neighboring pixels by a first blue threshold difference determining if the blue pixel is in a locally flat area and determining if the blue pixel is in a locally dark area and replacing the blue pixel with a mean of first selected blue-nearby pixels if the blue pixel exceeds the first selected blue-neighboring pixels by the first blue threshold difference and if the blue pixel is in a locally flat area or a locally dark area; and determining if the blue pixel is less than second selected blue-neighboring pixels by a second blue threshold difference and determining if the blue pixel is in a locally flat area and replacing the blue pixel with a mean of second selected blue-nearby pixels if the blue pixel is less than the second selected blue-neighboring pixels by the second blue threshold difference and if the blue pixel is in a locally flat area; and determining if the pixel is less than third selected blue-neighboring pixels by a third blue threshold difference and determining if the blue pixel is in a locally flat area and determining if the blue pixel is in a locally dark area and replacing the blue pixel with a mean of third selected blue-nearby pixels if the blue pixel is less than the third selected blue-neighboring pixels by the third blue threshold difference if the blue pixel is in a locally flat area and in a locally dark area.

14. The method of claim 13 wherein the plurality of red-nearby pixels comprise two green pixels and two red pixels.

15. A processor, tangibly embodying a program of instructions to perform method steps for digital image processing, comprising the machine executed steps of:

receiving image data defining the image, the image data including a plurality of pixels;

for each green pixel in the plurality of pixels, replacing likely corrupt green pixels by:

determining if a green pixel exceeds first selected green-neighboring pixels by a first green threshold difference and replacing the green pixel with an average of first selected green-nearby pixels if the green pixel exceeds the first selected green-neighboring pixels by the first green threshold difference; and determining if the green pixel is less than second selected green-neighboring pixels by a second green threshold difference and replacing the green pixel with an average of selected green-nearby pixels if the green pixel is less than the second selected green-neighboring pixels by the second green threshold difference; and for each red pixel in the plurality of pixels, replacing likely corrupt red pixels by:

determining if a red pixel exceeds first selected red-neighboring pixels by a first red threshold difference and replacing the red pixel with a maximum of first selected red-nearby pixels if the red pixel exceeds the first selected red-neighboring pixels by the first red threshold difference; and determining if the red pixel exceeds second selected red-neighboring pixels by a second red threshold difference and determining if the red pixel is in a locally flat area and determining if the red pixel is in a locally dark area and replacing the red pixel with a maximum of second selected red-nearby pixels if the red pixel exceeds the second selected red-neighboring pixels by the second red threshold difference and if the red pixel is in a locally flat area or a locally dark area; and determining if the red pixel is less than third selected red-neighboring pixels by a third red threshold difference and replacing the red pixel with a mean of third selected red-nearby pixels if the red pixel is less than the third selected red-neighboring pixels by the third red threshold difference; and determining if the red pixel is less than fourth selected red-neighboring pixels by a fourth red threshold difference and determining if the red pixel is in a locally flat area and replacing the red pixel with a mean of fourth selected red-nearby pixels if the red pixel is less than the fourth selected red-neighboring pixels by the fourth red threshold difference and if the red pixel is in a locally flat area; and for each blue pixel in the plurality of pixels, replacing likely corrupt blue pixels by:

determining if a blue pixel exceeds any pair of first selected blue-neighboring pixels by a first blue threshold difference determining if the blue pixel is in a locally flat area and determining if the blue pixel is in a locally dark area and replacing the blue pixel with a mean of first selected blue-nearby pixels if the blue pixel exceeds the first selected blue-neighboring pixels by the first blue threshold difference and if the blue pixel is in a locally flat area or a locally dark area; and determining if the blue pixel is less than second selected blue-neighboring pixels by a second blue threshold difference and determining if the blue pixel is in a locally flat area and replacing the blue pixel with a mean of second selected blue-nearby pixels if the blue pixel is less than the second selected blue-neighboring pixels by the second blue threshold difference and if the blue pixel is in a locally flat area; and determining if the pixel is less than third selected blue-neighboring pixels by a third blue threshold difference and determining if the blue pixel is in a locally flat area and determining if the blue pixel is in a locally dark area and replacing the blue pixel with a mean of third selected blue-nearby pixels if the blue pixel is less than the third selected blue-neighboring pixels by the third blue threshold difference if the blue pixel is in a locally flat area and in a locally dark area.

16. The processor of claim 15 wherein the plurality of red-nearby pixels comprise two green pixels and two red pixels.

* * * * *